US012473819B2

(12) United States Patent
Wang et al.

(10) Patent No.: US 12,473,819 B2
(45) Date of Patent: Nov. 18, 2025

(54) OPTIMIZING CHEMICAL TREATMENT AT THE SUBSURFACE FOR IMPROVED WELL PERFORMANCE

(71) Applicant: Chevron U.S.A. Inc., San Ramon, CA (US)

(72) Inventors: Wei Wang, Houston, TX (US); Wei Wei, Sugar Land, TX (US); Chao Yan, Sugar Land, TX (US); Wade H. Williams, Cypress, TX (US); Gregory A. Winslow, Houston, TX (US); Alicia Sanchez, Covington, LA (US); Sam Kidd, Houston, TX (US); Clinton C. Terry, Jefferson, LA (US); Baosheng Liang, Houston, TX (US); Soong Hay Tam, Midland, TX (US); Amos Sunghyun Kim, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 363 days.

(21) Appl. No.: 18/077,630

(22) Filed: Dec. 8, 2022

(65) Prior Publication Data
US 2023/0175387 A1  Jun. 8, 2023

Related U.S. Application Data

(60) Provisional application No. 63/287,103, filed on Dec. 8, 2021.

(51) Int. Cl.
*E21B 43/25* (2006.01)
*E21B 43/27* (2006.01)
*E21B 47/00* (2012.01)

(52) U.S. Cl.
CPC ............ *E21B 47/006* (2020.05); *E21B 43/27* (2020.05)

(58) Field of Classification Search
CPC .. G01N 33/2823; G01N 11/06; E21B 47/006; E21B 43/27; E21B 43/25; C09K 8/60
See application file for complete search history.

(56) References Cited

U.S. PATENT DOCUMENTS

| 4,562,726 A | * | 1/1986 | Barnaby | G01N 15/088 73/820 |
| 4,817,423 A | * | 4/1989 | Christiansen | G01N 33/241 73/152.05 |

(Continued)

OTHER PUBLICATIONS

Wei Wang, Wei Wei, David Leach, Chao Yan, and Kerry Spilker, "Rock-Fluid Interaction and Its Application in Unconventional Production", Unconventional Resources Technology Conference, Jul. 20-22, 2020, Austin, Texas, USA, 18 pages.

(Continued)

*Primary Examiner* — Edwin J Toledo-Duran
(74) *Attorney, Agent, or Firm* — Smith & Woldasonbet Law Group, PLLC

(57) ABSTRACT

A method for evaluating a chemical treatment at a subsurface for improved well performance may include obtaining information about a post-reaction fluid that results from a fluid flowing through a testing vessel for a period of time, where the testing vessel comprises a plurality of materials, where the plurality of materials is designed to be representative of the subsurface, and where the plurality of materials comprises rock and proppant. The method may also include performing, using the information, a compatibility test on the post-reaction fluid and the plurality of materials after the period of time. The method may further include evaluating, after performing the compatibility test, an effect of the post-reaction fluid on the plurality of materials.

20 Claims, 13 Drawing Sheets

(56) References Cited

U.S. PATENT DOCUMENTS

| | | | | |
|---|---|---|---|---|
| 4,922,758 | A * | 5/1990 | Penny | E21B 49/00 73/38 |
| 5,103,905 | A * | 4/1992 | Brannon | E21B 43/267 166/308.1 |
| 5,297,420 | A * | 3/1994 | Gilliland | G01N 33/241 73/38 |
| 5,929,002 | A * | 7/1999 | Joyce | C09K 8/62 507/212 |
| 5,948,733 | A * | 9/1999 | Cawiezel | C09K 8/62 507/212 |
| 9,840,898 | B2 * | 12/2017 | Kasevich | E21B 43/006 |
| 10,161,242 | B2 * | 12/2018 | Burks | G01N 11/06 |
| 12,071,833 | B2 * | 8/2024 | Wang | C09K 8/528 |
| 2002/0023752 | A1 * | 2/2002 | Qu | C09K 8/74 507/131 |
| 2004/0094298 | A1 * | 5/2004 | Tare | C09K 8/50 166/250.14 |
| 2005/0019951 | A1 * | 1/2005 | Gjerde | B01J 20/285 436/180 |
| 2006/0225523 | A1 * | 10/2006 | Reddy | G01N 11/08 73/865.6 |
| 2007/0235189 | A1 * | 10/2007 | Milne | C09K 8/74 507/923 |
| 2008/0026957 | A1 * | 1/2008 | Gurmen | C09K 8/80 507/211 |
| 2008/0066537 | A1 * | 3/2008 | Hegeman | E21B 43/25 73/152.28 |
| 2008/0139412 | A1 * | 6/2008 | Fuller | C09K 8/52 507/219 |
| 2008/0162056 | A1 * | 7/2008 | Greaves | E21B 43/006 702/24 |
| 2008/0178683 | A1 * | 7/2008 | Heathman | G01N 3/24 73/803 |
| 2009/0241700 | A1 * | 10/2009 | Haggerty | G01N 33/24 73/865.6 |
| 2010/0101795 | A1 * | 4/2010 | Watson | E21B 43/267 166/308.1 |
| 2011/0295509 | A1 * | 12/2011 | Huynh | E21B 21/00 702/12 |
| 2012/0180551 | A1 * | 7/2012 | Reyes | G01N 15/00 73/61.71 |
| 2013/0125630 | A1 * | 5/2013 | Collins | E21B 43/20 73/64.56 |
| 2017/0003210 | A1 * | 1/2017 | Burks | G01N 33/2823 |
| 2019/0292881 | A1 * | 9/2019 | Zhang | E21B 47/10 |
| 2020/0333314 | A1 * | 10/2020 | Hu | G01N 33/24 |
| 2021/0285858 | A1 * | 9/2021 | Lu | G01N 3/36 |
| 2023/0135692 | A1 * | 5/2023 | Wang | C09K 8/524 73/61.62 |
| 2023/0213423 | A1 * | 7/2023 | Li | G01N 33/24 73/786 |
| 2023/0399938 | A1 * | 12/2023 | Hernandez de la Bastida | E21B 37/06 |

OTHER PUBLICATIONS

Jerry Yan, Wei Wang, Wei Wei, and Gregory Winslow, "Optimizing the Selection and Application of Chemical Additives in Shale Reservoirs", Unconventional Resources Technology Conference, Jul. 26-28, 2021, Houston, Texas, USA, 10 pages.

* cited by examiner

OPTIMIZING CHEMICAL TREATMENT AT THE SUBSURFACE FOR IMPROVED WELL PERFORMANCE

CROSS-REFERENCE TO RELATED APPLICATIONS

This application claims priority to U.S. Provisional Patent Application Ser. No. 63/287,103 titled "Optimizing Chemical Treatment At The Subsurface For Improved Well Performance" and filed on Dec. 8, 2021, the entire contents of which are hereby incorporated herein by reference.

TECHNICAL FIELD

The present application is related to subterranean field operations and, more particularly, to optimizing chemical treatment at the subsurface for improved well performance.

BACKGROUND

Some subterranean formations, such as shale and tight formations, may produce subterranean resources through techniques such as horizontal drilling and fracturing. Over time, the production pathways such as fractures may become restricted or blocked because of the accumulation of scales and/or other solids (e.g., formation fines). Preventing or mitigating the development and growth of these scales and/or solids may lead to enhanced extraction of the subterranean resources for an extended period of time.

SUMMARY

In general, in one aspect, the disclosure relates to a method for evaluating a chemical treatment at a subsurface for improved well performance. The method may include obtaining information about a post-reaction fluid that results from an initial fluid flowing through a testing vessel for a period of time, where the testing vessel includes a plurality of materials, and where the plurality of materials is designed to be representative of a subterranean formation within the subsurface, and where the plurality of materials comprises rock and proppant. The method may also include performing, using the information, a compatibility test on the post-reaction fluid and the plurality of materials after the period of time. The method may further include evaluating, after performing the compatibility test, an effect of the post-reaction fluid on the plurality of materials.

In another aspect, the disclosure relates to a system for evaluating a chemical treatment at a subsurface for improved well performance. The system may include a post-reaction fluid collection system that is configured to receive a post-reaction fluid from a reaction module, where the post-reaction fluid includes an initial fluid after the initial fluid flows through a plurality of materials in a testing vessel of the reaction module, where the plurality of materials includes rock and proppant, where the plurality of materials is designed to be representative of a subterranean formation at the subsurface, and where the reaction module is further configured to provide the initial fluid that flows through plurality of materials in the testing vessel for a period of time.

In yet another aspect, the disclosure relates to a method for evaluating a chemical treatment at a subsurface for improved well performance. The method may include combining an initial fluid and a plurality of materials in a testing vessel for a period of time, where the plurality of materials is designed to be representative of the subsurface, and where the plurality of materials comprises rock and proppant. The method may also include removing a post-reaction fluid from the testing vessel after the period of time, where the post-reaction fluid results after combining the initial fluid and the plurality of materials. The method may further include performing a compatibility test on the post-reaction fluid and the plurality of materials after the period of time. The method may also include evaluating, based on results of the compatibility test, an effect of the post-reaction fluid on the plurality of materials.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1A:
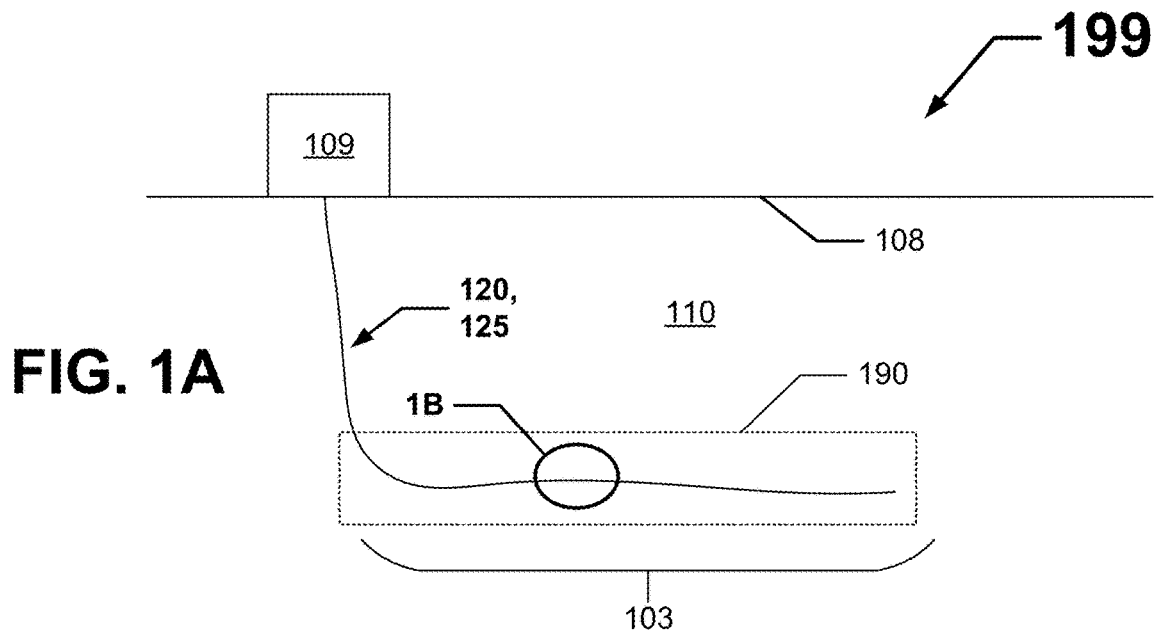
FIGS. 1A through 1C show a field system, and details thereof, with which example embodiments may be used.

The example embodiments discussed herein are directed to systems, apparatus, methods, and devices for optimizing chemical treatment at the subsurface for improved well performance. The subterranean resources captured using example embodiments may include, but are not limited to, oil and natural gas. Creating one or more wellbores with induced fractures and/or using such wellbores with example embodiments may be designed to comply with certain standards and/or requirements. Example embodiments may be used for wellbores drilled in conventional and/or unconventional (e.g., tight shale) subterranean formations and reservoirs.

The use of the terms "about", "approximately", and similar terms applies to all numeric values, whether or not explicitly indicated. These terms generally refer to a range of numbers that one of ordinary skill in the art would consider as a reasonable amount of deviation to the recited numeric values (i.e., having the equivalent function or result). For example, this term may be construed as including a deviation of ±10 percent of the given numeric value provided such a deviation does not alter the end function or result of the value. Therefore, a value of about 1% may be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

A "subterranean formation" refers to practically any volume under a surface. For example, it may be practically any volume under a terrestrial surface (e.g., a land surface), practically any volume under a seafloor, etc. Each subsurface volume of interest may have a variety of characteristics, such as petrophysical rock properties, reservoir fluid properties, reservoir conditions, hydrocarbon properties, or any combination thereof. For example, each subsurface volume of interest may be associated with one or more of: temperature, porosity, salinity, permeability, water composition, mineralogy, hydrocarbon type, hydrocarbon quantity, reservoir location, pressure, etc. Those of ordinary skill in the art will appreciate that the characteristics are many, including, but not limited to: shale gas, shale oil, tight gas, tight oil, tight carbonate, carbonate, vuggy carbonate, unconventional (e.g., a permeability of less than 25 millidarcy (mD) such as a permeability of from 0.000001 mD to 25 mD)), diatomite, geothermal, mineral, etc. The terms "formation", "subsurface formation", "hydrocarbon-bearing formation", "reservoir", "subsurface reservoir", "subsurface area of interest", "subsurface region of interest", "subsurface volume of interest", and the like may be used synonymously. The term "subterranean formation" is not limited to any description or configuration described herein.

A "well" or a "wellbore" refers to a single hole, usually cylindrical, that is drilled into a subsurface volume of interest. A well or a wellbore may be drilled in one or more directions. For example, a well or a wellbore may include a vertical well, a horizontal well, a deviated well, and/or other type of well. A well or a wellbore may be drilled in the subterranean formation for exploration and/or recovery of resources. A plurality of wells (e.g., tens to hundreds of wells) or a plurality of wellbores are often used in a field depending on the desired outcome.

A well or a wellbore may be drilled into a subsurface volume of interest using practically any drilling technique and equipment known in the art, such as geosteering, directional drilling, etc. Drilling the well may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling tools, wireline tools, logging-while-drilling (LWD) tools, or other downhole tools. After drilling to a predetermined depth, the drill string and the drill bit may be removed, and then the casing, the tubing, and/or other equipment may be installed according to the design of the well. The equipment to be used in drilling the well may be dependent on the design of the well, the subterranean formation, the hydrocarbons, and/or other factors.

A well may include a plurality of components, such as, but not limited to, a casing, a liner, a tubing string, a sensor, a packer, a screen, a gravel pack, artificial lift equipment (e.g., an electric submersible pump (ESP)), and/or other components. If a well is drilled offshore, the well may include one or more of the previous components plus other offshore components, such as a riser. A well may also include equipment to control fluid flow into the well, control fluid flow out of the well, or any combination thereof. For example, a well may include a wellhead, a choke, a valve, and/or other control devices. These control devices may be located on the surface, in the subsurface (e.g., downhole in the well), or any combination thereof. In some embodiments, the same control devices may be used to control fluid flow into and out of the well. In some embodiments, different control devices may be used to control fluid flow into and out of a well. In some embodiments, the rate of flow of fluids through the well may depend on the fluid handling capacities of the surface facility that is in fluidic communication with the well. The equipment to be used in controlling fluid flow into and out of a well may be dependent on the well, the subsurface region, the surface facility, and/or other factors. Moreover, sand control equipment and/or sand monitoring equipment may also be installed (e.g., downhole and/or on the surface). A well may also include any completion hardware that is not discussed separately. The term "well" may be used synonymously with the terms "borehole," "wellbore," or "well bore." The term "well" is not limited to any description or configuration described herein.

In some cases, optimizing chemical treatment at the subsurface for improved well performance may include reducing deposition of scales and/or other solids. As defined herein, reducing deposition of scales and/or other solids may involve any of a number of different actions. For example, reducing deposition of scales and/or other solids may include minimizing the accumulation or deposition of scales and/or other solids without completely eliminating the scales and/or other solids. As another example, reducing deposition of scales and/or other solids as defined herein may additionally or alternatively mean preventing the development of scale depositions and/or other solids. As yet another example, reducing deposition of scales and/or other solids as defined herein may additionally or alternatively mean completely eliminating scales and/or other solids that have previously developed.

Example embodiments of optimizing chemical treatment at the subsurface for improved well performance may be at a subsurface (e.g., within and adjacent to a wellbore in a subterranean formation). Example embodiments of optimizing chemical treatment at the subsurface for improved well performance may additionally or alternatively be used in any of a number of other applications. For instance, example embodiments may be used to optimize chemical treatment for improved performance in surface equipment. Such surface equipment may include, but is not limited to, heat exchangers and conduit or other pipes (e.g., a pipeline, a drain pipe) used to transport fluid (e.g., natural gas).

Example embodiments may also be used for saltwater disposal (SWD) injection wells. Example embodiments may also be used for carbon capture and/or sequestration applications. For instance, water may be produced from a subterranean formation, and the produced water may be disposed via downhole water injection. Scale formation and solid plugging issues may be a significant cause for injectivity decrease/and other challenges for the water disposal wells. The performance/injectivity of the SWD wells may play a key role on the sustainability of $CO_2$ injection. The workflow/method in example embodiments may be used to optimize chemical treatments for improving injection well performance.

Example embodiments may also be used for geothermal applications. For instance, geothermal assets may be used in a high temperature environment (as what exists in a wellbore), which may lead to severe scaling issues and incompatibility issue between fluid and chemicals. Chemical treatment using example embodiments may be evaluated and/or optimized, including evaluation and optimization of solids (e.g., formation rock, sand).

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

If a component of a figure is described but not expressly shown or labeled in that figure, the label used for a corresponding component in another figure may be inferred to that component. Conversely, if a component in a figure is labeled but not described, the description for such component may be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of optimizing chemical treatment at the subsurface for improved well performance will be described more fully hereinafter with reference to the accompanying drawings, in which example embodiments of optimizing chemical treatment at the subsurface for improved well performance are shown. Optimizing chemical treatment at the subsurface for improved well performance may, however, be embodied in many different forms and should not be construed as limited to the example embodiments set forth herein. Rather, these example embodiments are provided so that this disclosure will be thorough and complete, and will fully convey the scope of optimizing chemical treatment at the subsurface for improved well performance to those of ordinary skill in the art. Like, but not necessarily the same, elements (also sometimes called components) in the various figures are denoted by like reference numerals for consistency.

Terms such as "first", "second", "primary," "secondary," "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. This list of terms is not exclusive. Such terms are not meant to denote a preference or a particular orientation, and they are not meant to limit embodiments of optimizing chemical treatment at the subsurface for improved well performance. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
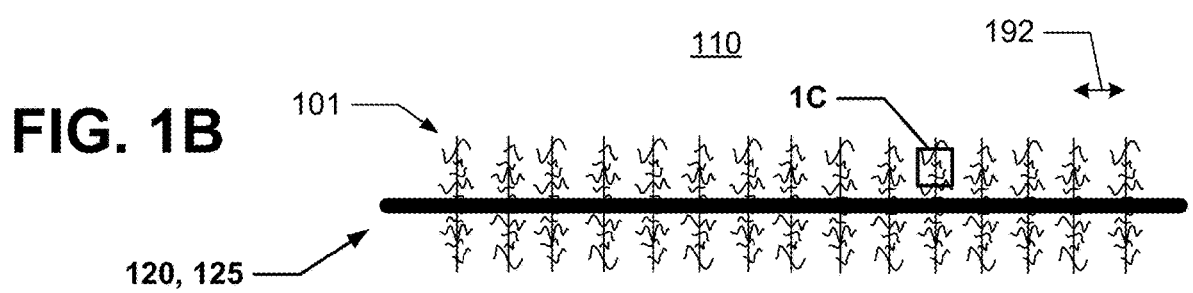
Figure 1C:
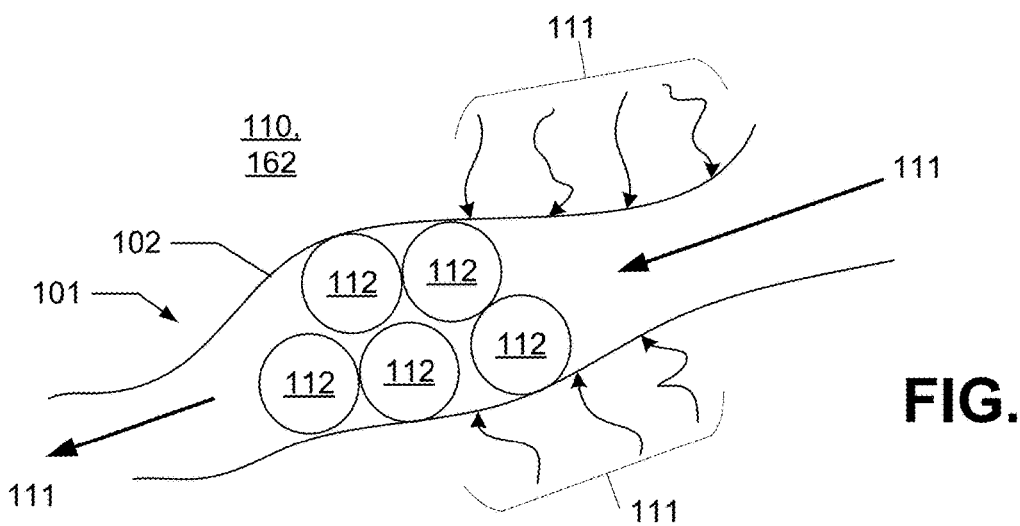

FIGS. 1A through 1C show a field system 199, including details thereof, with which example embodiments may be used. Specifically, FIG. 1A shows a schematic diagram of a land-based field system 199 in which a wellbore 120 has been drilled in a subterranean formation 110. FIG. 1B shows a detail of a substantially horizontal section 103 of the wellbore 120 of FIG. 1A. FIG. 1C shows a detail of an induced fracture 101 of FIG. 1B. The field system 199 in this example includes a wellbore 120 disposed in a subterranean formation 110 using field equipment 109 (e.g., a derrick, a tool pusher, a clamp, a tong, drill pipe, casing pipe, a drill bit, a wireline tool, a fluid pumping system) located above a surface 108 and within the wellbore 120. Once the wellbore 120 is drilled, a casing string 125 is inserted into the wellbore 120 to stabilize the wellbore 120 and allow for the extraction of subterranean resources (e.g., natural gas, oil) from the subterranean formation 110.

The surface 108 may be ground level for an onshore application and the sea floor/lakebed for an offshore application. For offshore applications, at least some of the field equipment may be located on a platform that sits above the water level. The point where the wellbore 120 begins at the surface 108 may be called the wellhead. While not shown in FIGS. 1A and 1B, there may be multiple wellbores 120, each with its own wellhead but that is located close to the other wellheads, drilled into the subterranean formation 110 and having substantially horizontal sections 103 that are close to each other. In such a case, the multiple wellbores 120 may be drilled at the same pad or at different pads. When the drilling process is complete, other operations, such as fracturing operations, may be performed. The fractures 101 are shown to be located in the horizontal section 103 of the wellbore 120 in FIG. 1B. The fractures 101, whether induced and/or naturally occurring, may additionally or alternatively be located in other sections (e.g., a substantially vertical section, a transition area between a vertical section and a horizontal section) of the wellbore 120. Example embodiments may be used along any portion of the wellbore 120 where fractures 101 are located.

The subterranean formation 110 may include one or more of a number of formation types, including but not limited to shale, limestone, sandstone, clay, sand, and salt. In certain embodiments, a subterranean formation 110 may include one or more reservoirs in which one or more resources (e.g., oil, natural gas, water, steam) may be located. One or more of a number of field operations (e.g., fracturing, coring, tripping, drilling, setting casing, extracting downhole resources) may be performed to reach an objective of a user with respect to the subterranean formation 110.

The wellbore 120 may have one or more of a number of segments or hole sections, where each segment or hole section may have one or more of a number of dimensions. Examples of such dimensions may include, but are not limited to, a size (e.g., diameter) of the wellbore 120, a curvature of the wellbore 120, a total vertical depth of the wellbore 120, a measured depth of the wellbore 120, and a horizontal displacement of the wellbore 120. There may be multiple overlapping casing strings of various sizes (e.g., length, outer diameter) contained within and between these segments or hole sections to ensure the integrity of the wellbore construction. In this case, one or more of the segments of the subterranean wellbore 120 is the substantially horizontal section 103.

As discussed above, inserted into and disposed within the wellbore 120 of FIGS. 1A and 1B are a number of casing pipes that are coupled to each other end-to-end to form the casing string 125. In this case, each end of a casing pipe has mating threads (a type of coupling feature) disposed thereon, allowing a casing pipe to be directly or indirectly mechanically coupled to another casing pipe in an end-to-end configuration. The casing pipes of the casing string 125 may be indirectly mechanically coupled to each other using a coupling device, such as a coupling sleeve.

Each casing pipe of the casing string 125 may have a length and a width (e.g., outer diameter). The length of a casing pipe may vary. For example, a common length of a casing pipe is approximately 40 feet. The length of a casing pipe may be longer (e.g., 60 feet) or shorter (e.g., 10 feet) than 40 feet. The width of a casing pipe may also vary and may depend on the cross-sectional shape of the casing pipe. For example, when the shape of the casing pipe is cylindrical, the width may refer to an outer diameter, an inner diameter, or some other form of measurement of the casing pipe. Examples of a width in terms of an outer diameter may include, but are not limited to, 4½ inches, 7 inches, 7⅝ inches, 8⅝ inches, 10¾ inches, 13⅜ inches, and 14 inches.

The size (e.g., width, length) of the casing string 125 may be based on the information (e.g., diameter of the borehole drilled) gathered using field equipment with respect to the subterranean wellbore 120. The walls of the casing string 125 have an inner surface that forms a cavity that traverses the length of the casing string 125. Each casing pipe may be made of one or more of a number of suitable materials, including but not limited to steel. Cement 109 is poured into the wellbore 120 through the cavity and then forced upward between the outer surface of the casing string 125 and the wall of the subterranean wellbore 120. In some cases, a liner may additionally be used with, or alternatively be used in place of, some or all of the casing pipes.

Once the cement dries to form concrete, a number of fractures 101 are induced in the subterranean formation 110. The fractures 101 may be induced in any of a number of ways known in the industry, including but not limited to hydraulic fracturing, fracturing using electrodes, and/or other methods of inducing fractures. The hydraulic fracturing process involves the injection of large quantities of fluids containing water, chemical additives, and proppants 112 into the subterranean formation 110 from the wellbore 120 to create fracture networks. An example of fracturing using electrodes may be found in U.S. Pat. No. 9,840,898 issued on Dec. 12, 2017, to Kasevich et al., the entirety of which is herein incorporated by reference. A subterranean formation 110 naturally has fractures 101, but these naturally occurring fractures 101 have inconsistent characteristics (e.g., length, spacing) and so in some cases cannot be relied upon for extracting subterranean resources without having additional fractures 101, such as what is shown in FIG. 1B, induced in the subterranean formation 110.

Induced fractures 101 may propagate toward lower stress rock and in the direction perpendicular to the current (at the time of a fracturing operation) least principal horizontal stress. Operations that induce fractures 101 in the subterranean formation 110 use any of a number of fluids that include proppant 112 (e.g., sand, ceramic pellets). When proppant 112 is used, some of the fractures 101 (also sometimes called principal or primary fractures) receive proppant 112, while a remainder of the fractures 101 (also sometimes called secondary fractures) do not have any proppant 112 in them.

As shown in FIG. 1C, the proppant 112 is designed to become lodged inside at least some of the induced fractures 101 to keep those fractures 101 open after the fracturing operation is complete. The size of the proppant 112 is an important design consideration. Sizes (e.g., 40/70 mesh, 50/140 mesh) of the proppant 112 may vary. While the shape of the proppant 112 is shown as being uniformly spherical, and the size is substantially identical among the proppant 112, the actual sizes and shapes of the proppant 112 may vary. If the proppant 112 is too small, the proppant 112 will not be effective at keeping the fractures 101 open enough to effectively allow subterranean resources 111 to flow through the fractures 101 from the rock matrices 162 in the subterranean formation 110 to the wellbore 120. If the proppant 112 is too large, the proppant 112 may plug up the fractures 101, blocking the flow of the subterranean resources 111 through the fractures 101.

The use of proppant 112 in certain types of subterranean formation 110, such as shale and other tight formations, is important. Shale formations typically have permeabilities on the order of microdarcys (µD) to nanodarcys (nD). When fractures 101 are induced in such formations with low permeabilities, it is important to sustain the fractures 101 and their conductivity for an extended period of time in order to extract more of the subterranean resource 111.

The various induced fractures 101 that originate at the wellbore 120 and extend outward into the rock matrices 162 in the subterranean formation 110 in this case may have consistent penetration lengths perpendicular to the wellbore 120 and have consistent coverage along at least a portion of the lateral length (substantially horizontal section) of the wellbore 120. For example, induced fractures 101 may be 50 meters high and 200 meters long. Further, the induced fractures 101 may be spaced a distance 192 apart from each other. The distance 192 (e.g., 25 meters, 5 meters, 12 meters) may be optimized based on the permeability and the porosity of the rock matrix 162 of the subterranean formation 110.

The induced fractures 101 create a volume 190 within the subterranean formation 110 where the rock matrix 162 of the subterranean formation 110 is connected to the high conductivity fractures 101 located a short distance away. In addition to different configurations of the fractures 101, other factors that may contribute to the viability of the subterranean formation 110 may include, but are not limited to, permeability of the rock matrix 162, capillary pressure, and the temperature and pressure of the subterranean formation 110. Each fracture 101, whether induced or naturally occurring, is defined by a wall 102, also called a frac face 102 herein. The frac face 102 provides a transition between the paths formed by the rock matrices 162 in the subterranean formation 110 and the fracture 101. The subterranean resources 101 flow through the paths formed by the rock matrices 162 in the subterranean formation 110 into the fracture 101.

Figure 2:
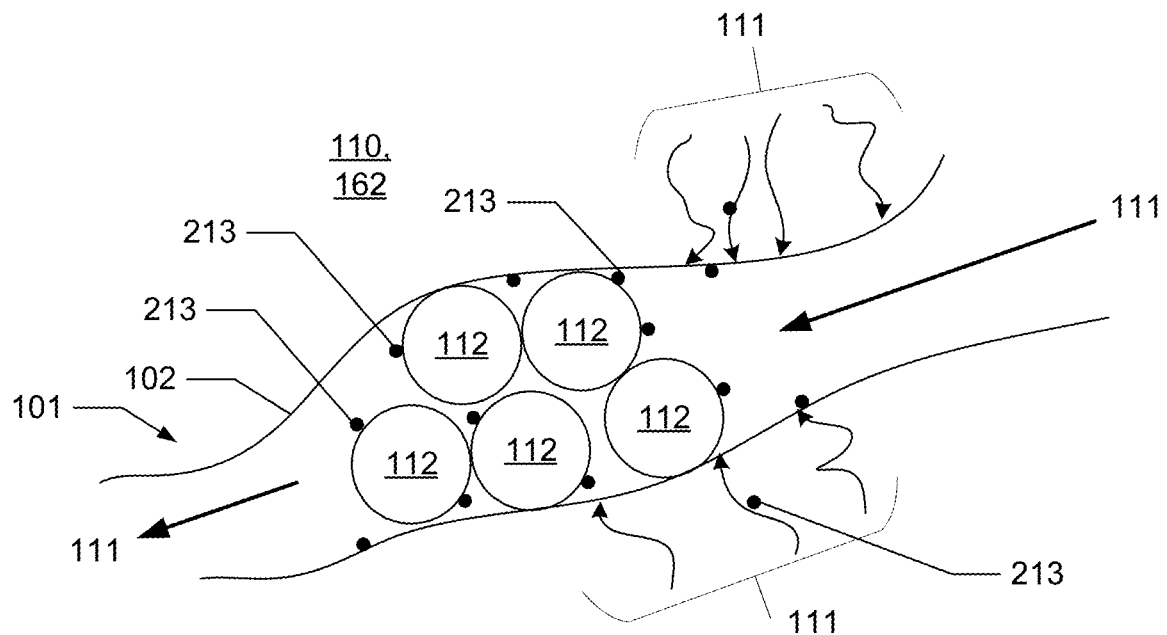
FIG. 2 shows the detail of FIG. 1C at a subsequent point in time according to certain example embodiments.
Figure 3:
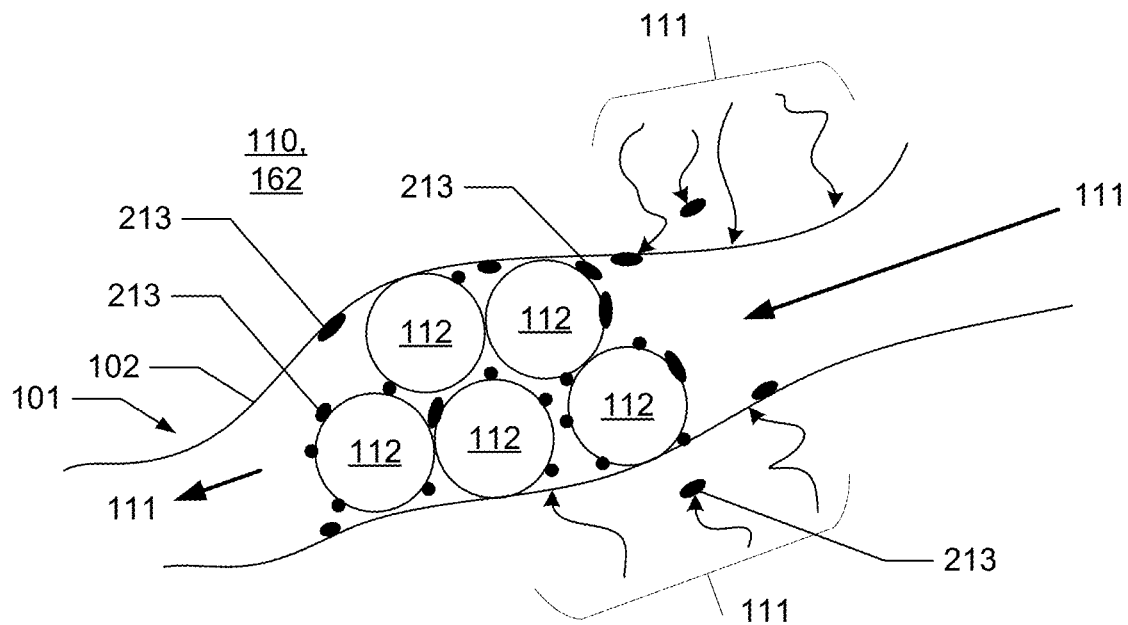
FIG. 3 shows the detail of FIG. 2 at a subsequent point in time according to certain example embodiments.

FIG. 2 shows the detail of FIG. 1C at a subsequent point in time according to certain example embodiments. FIG. 3 shows the detail of FIG. 2 at a subsequent point in time according to certain example embodiments. For example, FIG. 2 may show the detail of FIG. 1C six months later than the time captured in FIG. 1C after flowing a fluid having a scale enhancer therethrough, and FIG. 3 may show the detail of FIG. 2 four year later than the time captured in FIG. 2 after continuing to flow the fluid having the scale enhancer therethrough. Referring to FIGS. 1A through 3, the detail in FIG. 2 shows, in addition to the proppant 112 within the fracture 101, a subterranean resource 111 (e.g., natural gas, oil) is shown flowing within the fracture 101 from the rock matrix 162, around the proppant 112 in the fracture 101, and on to the wellbore 120.

As the subterranean resource 111 flows within the paths formed by the rock matrices 162 and around the proppant 112 in the fracture 101, scale depositions 213 may occur (e.g., scale particles formed during the shut-in stage before the well is put into production) on the within the rock matrices 162, on the proppant 112, and/or on the frac face 102. Over time, the scale depositions 213 may begin to accumulate on the rock matrices 162, on the proppant 112, and/or on the frac face 102. Each of the scale depositions 213 is an inorganic deposit from ionic materials in water that attaches to solid surfaces. Hydrocarbons may be adsorbed on scale depositions 213. Under field conditions, scale depositions 213 may be a mixture of inorganic and organic components. In some cases, scale depositions 213 may be or include rust or other forms of corrosion. In some cases, scale depositions 213 may be or include a calcium-based accumulation.

Scale depositions 213 may be initiated during a prior phase (e.g., completion) of a field operation, where fluids and chemicals used downhole may interact with formation rock (e.g., the frac face 102, the rock matrices 162) and comingle with formation water in and/or near perforations and along the fractures 101, resulting in the mobilization and release of elements from the rock matrices 162 adjacent to the fractures 101. Later, in a subsequent phase (e.g., shutting in) of the field operation, the rock-fluid interaction and the commingling of different fluids may lead to the formation (crystallization) and growth of scale depositions 213 in or near the perforations, the rock matrices 162, and the fractures 101. In yet another subsequent phase (e.g., production) of the field operation, the degradation in the conductivity and production flow path integrity over time in the rock matrices 162 and the fractures 101, caused by agglomerate build-up of scale depositions 213, may lead to plugging in or near the perforations, rock matrices 162, fractures 101, and completion tools.

The scale depositions 213 that accumulate within the rock matrices 162 and the fractures 101 may be composed of one or more of any of a number of compounds, including but not limited to calcium carbonate, barium sulfate, calcium sulfate, strontium sulfate, iron carbonate, iron oxide, iron sulfide, other oxides, other sulfides, other carbonates, other sulfates, halides, and/or hydroxides. While the scale depositions 213 may additionally or alternatively be composed of other compounds (e.g., gas hydrates, organic deposits (e.g., asphaltenes, waxes, acid induced accumulations), and naphthenates), example embodiments focus on the reduction of scale depositions 213 caused by inorganic deposits. The scale depositions 213 may be caused by one or more of any of a number of factors, including but not limited to supersaturation, mixing incompatible ions, changes in temperature, changes in pressure, carbon dioxide evolution, and a change in the pH of water in the fluid.

Scale depositions 213 may form during the shut-in stage prior to the well being put into production, as shown in FIG. 2. In such a case, the scale depositions 213 disposed on the rock matrices 162, on the proppant 112, and on the frac face 102 are small and spotty. As a result, the scale depositions 213 do not contribute much to inhibiting the flow of the subterranean resource 111 through the paths within the rock matrices 162 and around the proppant 112 within the fracture 101 formed by the frac face 102. In the portion of the fracture 101 shown at the time captured in FIG. 2, there are 2 separate scale depositions 213 within the rock matrices 162, 8 scale depositions 213 on the proppant 112, and 4 scale depositions 213 on the frac face 102. The number, size, and location of the scale depositions 213 within the rock matrices 162 and the fracture 101 may vary.

When the well is put into production, some scale particles 213 may stay at their original position, while some scale particles may move/migrate together with the produced water and deposit at another location along the production pathway. As more water is produced, the existing scale depositions 213 may increase in size and new scale depositions 213 may develop over time. An example of this is captured in FIG. 3, which shows that the scale depositions 213 become larger and less spotty. As a result, the scale depositions 213 in FIG. 3 begin to contribute to inhibiting the flow of the subterranean resource 111 along the paths formed by the rock matrices 162, through the frac face 102 (impacting migration of the hydrocarbon 111 from the rock matrix 162), and around the proppant 112 (combined with the scale depositions 213 on the proppant 112 and on the frac face 102) within the fracture 101.

In the portion of the fracture 101 shown at the time captured in FIG. 3, there are 25 separate scale depositions 213 within the rock matrices 162, at the frac face 102, and on the proppant 112, many of which are significantly larger than the size of the scale depositions 213 shown in FIG. 2. Also, some of the scale depositions 213 in FIG. 3 have migrated to a new location relative to their location in FIG. 2. Again, the number, size, and location of the scale depositions 213 within the fracture 101 may vary.

In the current art, fluids (e.g., acids, chelants) are injected from the wellbore 120 into the fractures 101 to remove scale, clear perforations, and/or generate other results that may enhance production. However, as these fluids react with the fractures, proppant, rock matrices, and other elements in the volume 190, the fluids change in structure. Such changes in structure of the fluids used to enhance production of the subterranean resource 111 within the volume 190 may actually have adverse effects (e.g., create other types of blockage in the fractures 101) on production capability. Example embodiments are designed to analyze the post-reaction composition of various fluids that may be used within a volume 190 of known composition and determine a fluid that both enhances production of the subterranean resource 111 within the volume 190 in its original form and also minimizes adverse effects on the enhanced production of the subterranean resource 111 within the volume 190 in its post-reaction form. Example embodiments are also designed to determine the optimal way to use a fluid, both in its original form and in its post-reaction form, to enhance production in the volume 190 by mitigating the adverse effects that could develop from one or more components of the post-reaction form of the fluid in that particular field operation.

Figure 4:
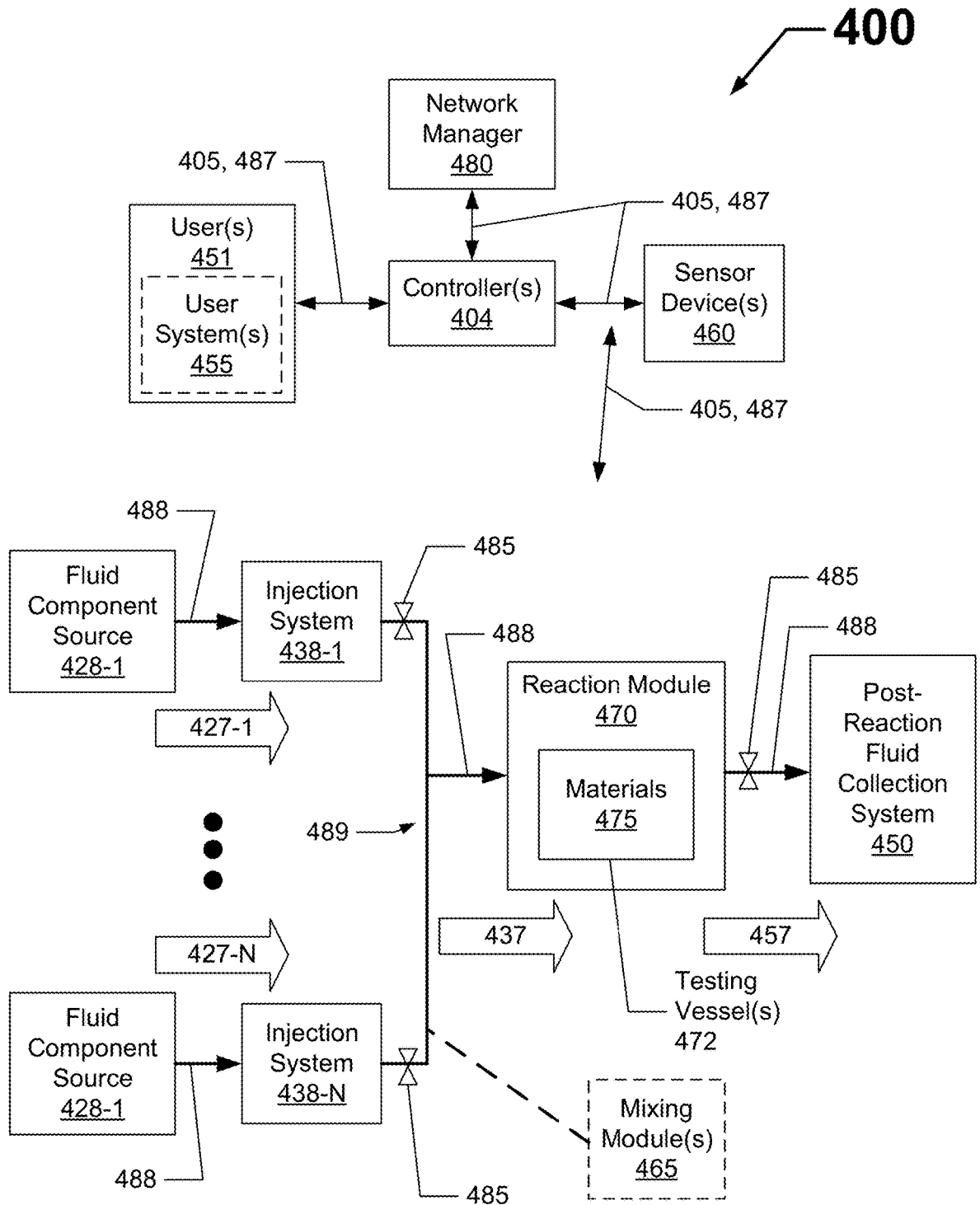
FIG. 4 shows a diagram of a testing system for optimizing chemical treatment at the subsurface for improved well performance according to certain example embodiments.

FIG. 4 shows a diagram of a system 400 for optimizing chemical treatment at the subsurface for improved well performance according to certain example embodiments. The system 400 of FIG. 4 includes one or more fluid component sources 428, one or more injection systems 438, a reaction module 470, a post-reaction fluid collection system 450, one or more optional mixing modules 465, one or more controllers 404, one or more sensor devices 460, one or more users 451 (including one or more optional user systems 455), a network manager 480, piping 488, and one or more valves 485. The reaction module 470 includes a testing vessel 472.

The components shown in FIG. 4 are not exhaustive, and in some embodiments, one or more of the components shown in FIG. 4 may not be included in the example testing system 400. Any component of the testing system 400 may be discrete or combined with one or more other components of the testing system 400. Also, one or more components of the testing system 400 may have different configurations. For example, one or more sensor devices 460 may be disposed within or disposed on other components (e.g., the piping 488, a valve 485, the reaction module 470, the post-reaction fluid collection system 450). As another example, a controller 404, rather than being a stand-alone device, may be part of one or more other components (e.g., reaction module 470, the post-reaction fluid collection system 450, an injection system 438) of the testing system 400.

Referring to FIGS. 1A through 4, a fluid 437 (in this case, a fluid in at least partially liquid form) is pushed through the testing vessel 472 of the reaction module 470 to chemically treat the material 475 inside the testing vessel 472. The fluid 437 (e.g., HCl, $CH_3COOH$, HCOOH, boric acid, HF, a chelant, etc.) may be made up of multiple fluid components 427 (e.g., water, chlorine, boron, fluoride) that are mixed together before reaching the reaction module 470. A fluid component 427 may be in solid, liquid, and/or gaseous form. Two or more fluid components 427 may be mixed together in the piping 488 at a header 489 as those fluid components 427 interact with each other to form a fluid 437 (also sometimes called an initial fluid 437 herein) and flow toward the reaction module 470. Alternatively, the testing system 400 may include one or more of the optional mixing modules 465 that mix two or more fluid components 427 together before the fluid components 427 reach the reaction module 470 as a fluid 437. The fluid 437 has a chemistry composition of one or more fluid components 427 each having a concentration. A mixing module 465 may include one or more of a number of features used to mix two or more fluid components 427 together. Such features may include, but are not limited to, a vessel, a sensor device 460, a controller 404, an agitator, a paddle, a circulating system, an aerator, a vibrating mechanism, and a centrifuge. A mixing module 465 and the header 489 may each be referred to as a common vessel herein.

There may be one or more fluid component sources 428. In certain example embodiments, there are at least two fluid component sources 428. As shown in FIG. 4, the system 400 includes fluid component source 428-1 (which holds fluid component 427-1) through fluid component source 428-N (which holds fluid component 427-N). Each fluid component 427 (e.g., an additive) may be or include a fluid. A single fluid component 427 or a mixture of multiple fluid components 427 (but not the fluid 437) may be disposed in a fluid component source 428.

To control the chemistry composition of the fluid 437 at a given point in time, the amount of the individual fluid components 427 that are released or withdrawn from a fluid component source 428 may be regulated in real time. This regulation may be performed automatically by a controller 404 or manually by a user 451 (including an associated user system 455). This regulation may be performed using equipment such as the injection systems 438, valves 485, regulators, sensor devices 460, and meters. Examples of a fluid component source 428 may include, but are not limited to, a natural vessel and a man-made storage tank or other vessel. A fluid component 427 of a fluid component source 428 may have any of a number of different compositions that are naturally occurring or man-made. In some cases, a fluid component 427 of the fluid 437 includes water.

Each injection system 438 is configured to extract a fluid component 427 from a fluid component source 428 and push the fluid component 427 toward the reaction module 470. The number of injection systems 438 in the testing system 400 may vary. In this case, there are N injection systems 438 (injection 438-1 through 438-N). In some embodiments, there may be one injection system 438 for each fluid component source 428. In alternative embodiments, there may be one injection system 438 for multiple fluid component sources 428. Each injection system 438 may include one or more of a number of pieces of equipment to perform its function. Examples of such equipment may include, but are not limited to, a compressor, a motor, a pump, piping (e.g., piping 488), a valve (e.g., valve 485), a controller (e.g., controller 404), and a sensor device (e.g., sensor device 460).

The piping 488 (including the header 489) may include multiple pipes, ducts, elbows, joints, sleeves, collars, and similar components that are coupled to each other (e.g., using coupling features such as mating threads) to establish a network for transporting the fluid components 427 from the fluid component sources 428, through the injection systems 438, to the header 489 (where the fluid components 427 mix together to form a fluid 437), to the reaction module 470, and finally from the reaction module 470 to the post-reaction fluid collection system 450. Each component of the piping 488 may have an appropriate size (e.g., inner diameter, outer diameter) and be made of an appropriate material (e.g., steel, PVC) to safely and efficiently handle the pressure, temperature, flow rate, and other characteristics of the fluid components 427 or the fluid 437, as applicable.

There may be a number of valves 485 placed in-line with the piping 488 at various locations (including at the header 489) in the testing system 400 to control the flow of fluid components 427 and/or each fluid 437 therethrough. A valve 485 may have one or more of any of a number of configurations, including but not limited to a guillotine valve, a ball valve, a gate valve, a butterfly valve, a pinch valve, a needle valve, a plug valve, a diaphragm valve, and a globe valve. One valve 485 may be configured the same as or differently compared to another valve 485 in the testing system 400. Also, one valve 485 may be controlled (e.g., manually, automatically by the controller 404) the same as or differently compared to another valve 485 in the testing system 400.

The reaction module 470 is configured to house or host one or more testing vessels 472. Examples of a reaction module 470 may be or include, but are not limited to, a pressurized vessel, a laboratory, a rack, a table, and a non-pressurized vessel. The reaction module 470 receives a fluid 437 from the header 489, runs the fluid 437 through a testing vessel 472, and sends the post-reaction fluid 457 to the post-reaction fluid collection system 450. In certain example embodiments, the testing vessels 472 are passive objects that have a fluid 437 pass through them without the testing vessels 472 being modified or taking action during this process. The reaction module 470 may control various aspects (e.g., temperature, pressure, flow rate) of the fluid 437 and/or the testing vessel 472. In some cases, the reaction module 470 is designed to subject the materials 475 in the testing vessel 472 to conditions (e.g., pressure, temperature, flow rate) that simulate the corresponding downhole conditions of the fractures 101 and rock matrix in the subterranean formation 110 adjacent to the wellbore 120. The reaction module 470 may include one or more of a number of pieces of equipment to perform these functions. Examples of such equipment may include, but are not limited to, a motor, a pump, a compressor, piping (e.g., piping 488), a valve (e.g., valve 485), a controller (e.g., controller 404), and a sensor device (e.g., sensor device 460).

A testing vessel 472 is a vessel (e.g., a column, a bottle, a test tube) inside of which various materials 475 (e.g., rock, proppant 112) are disposed. The materials 475 in a testing vessel 472 may be designed to simulate induced fractures 101 in a subterranean formation 110 adjacent to a wellbore 120. In some cases, the materials 475 placed in a testing vessel 472 are taken from the subterranean formation 110. For example, cuttings or other loose rock that circulate to the surface 108 during a field operation (e.g., drilling, completion) may be removed from the mud circulating system (part of the field equipment 109) and placed in a testing vessel 472. As another example, a core sample may be taken of the subterranean formation 110 by a tool (e.g., a wireline tool) placed in the wellbore 120 adjacent to the induced fractures 101. In such a case, the core sample may be retrieved from the tool when the tool is brought to the surface 108 and subsequently placed in a testing vessel 472. As still another example, proppant 112 used to prop open the induced fractures 101 adjacent to the wellbore 120 may be used as some of the materials 475 in the testing vessel 472.

In some cases, the reaction module 470 may be configured to simulate downhole conditions. In any case, the material 475 in the testing vessel 472 is chemically treated with a fluid 437 that flows through the materials 475 in the testing vessel 472. In order to accomplish this, the testing vessel 472 may be made of any of a number of appropriate material (e.g., glass, lined stainless steel) that may withstand the conditions (e.g., pressure, temperature) simulated by the reaction module 470. After a period of time, the testing process may be paused or stopped so that the materials 475 in the testing vessel 472 and the post-reaction fluid 457 in the post-reaction fluid collection system 450 may be evaluated. In some example embodiments, the fluid 437 may be designed to eliminate or reduce scaling that may appear and grow on some of the materials 475 (e.g., the proppant 112 and/or rock) in the testing vessel 472. In addition, or in the alternative, the fluid 437 may be designed to clear perforations and/or otherwise enhance production of the subterranean resource 111 from the volume 190.

Evaluation of the materials 475 in the testing vessel 472 may include determining the amount of scale depositions 213 disposed on the proppant 112, rock, and/or other materials 475 in a testing vessel 472 over time. This evaluation may then be correlated to how effective the fluid 437 used during that phase of testing may be at reducing or eliminating scale depositions 213 in the induced fractures 101 adjacent to the wellbore 120. Further, evaluation of the post-reaction fluid 457 in the post-reaction fluid collection system 450 may determine the chemistry components (e.g., Fe, Ca, Mg, Al, Si, Ba, K, P, Mn, S, etc.) that are added to the post-reaction fluid 457 and/or the chemistry components that have a different concentration after the fluid 437 chemically treats the materials 475. In addition, evaluation of the post-reaction fluid 457 in the post-reaction fluid collection system 450 may also determine the impact of these added chemistry components on the materials 475, which may translate to the impact of these added chemistry components on well production performance after flowing the fluid 437 through the fractures 101 and rock matrices in the volume 190 of the subterranean formation 110.

Regardless of the goal of a fluid 437 (e.g., reaction module 470 to determine the general timeframe for when scale induction occurs on the materials 475, to determine if a non-scaling fluid 437 may pass through the materials 475 in the testing vessel 472 without disturbing the proppant 112, to demonstrate that a particular fluid 437 decreases formation of scale depositions 213 and other blockage in the materials 475 within the testing vessel 472, interaction between a fluid 437 and the materials 475 versus accumulation of scale depositions 213, interaction between a fluid 437 and debris from fractures 101 versus interaction between the fluid 437 and proppant 112 in the materials 475), example embodiments analyze the post-reaction fluid 457 that gathers in the post-reaction fluid collection system 450 reaction module.

In some cases, the reaction module 470 may include one or more features (e.g., a spectrograph, a gas chromatograph, a camera with a high zoom lens, a controller 404, one or more sensor devices 460) that perform some or all of the evaluation of materials 475 within a testing vessel 472 that have been tested. The testing vessel 472 may be removable (e.g., by a user 451) from and insertable into the reaction module 470. The reaction module 470 may include one or more features (e.g., a clamp, a latched lid) that ensure that a testing vessel 472 is secure within the reaction module 470.

The post-reaction fluid collection system 450 is configured to receive the post-reaction fluid 457, which is the byproduct of the fluid 437 that has flowed through the materials 475 in one or more testing vessels 472 of the reaction module 470. The post-reaction fluid 457 may, in some cases, be spent acid, spent brine, and/or fluid after the materials 475 (e.g., formation rock, proppants 112, downhole materials) and the fluid 437 interact with each other in one or more testing vessels 472 of the reaction module 470. The post-reaction fluid 457 may be analyzed to measure cation/anion concentration and residue chemical concentration to understand fluid-rock interaction.

The post-reaction fluid collection system 450 may include a vessel to contain some or all of the post-reaction fluid 457. In some cases, such a vessel may be a testing vessel 472 or a vessel that is configured similar to a testing vessel 472. In certain example embodiments, the post-reaction fluid collection system 450 is configured to simulate downhole conditions. In order to accomplish this, the part of the post-reaction fluid collection system 450 that receives the post-reaction fluid 457 may be made of any of a number of appropriate material (e.g., glass, lined stainless steel) that may withstand the conditions (e.g., pressure, temperature) simulated by the post-reaction fluid collection system 450.

In some cases, the post-reaction fluid collection system 450 may also be configured to perform one or more tests on the post-reaction fluid 457. In such cases, the post-reaction fluid collection system 450 may include one or more of a number of features (e.g., a motor, a pump, a compressor, piping (e.g., piping 488), a valve (e.g., valve 485), a spectrograph, a gas chromatograph, a camera with a high zoom lens, a controller 404, one or more sensor devices 460) to conduct such testing.

As a result of the testing on the post-reaction fluid 457, the post-reaction fluid collection system 450 may determine or reveal one or more chemistry components (e.g., Fe, Ca, Mg, Al, Si, Ba, K, P, Mn, S) that are in the post-reaction fluid 457 but not in the fluid 437. In other words, the post-reaction fluid collection system 450 may determine or reveal one or more chemistry components that is picked up by the fluid 437 as the fluid 437 interacts with the materials 475 in a testing vessel 472 of the reaction module 470. In certain example embodiments, the post-reaction fluid collection system 450 may further determine the impact of the one or more chemistry components on the production performance of the fractures 101 and rock matrices in the volume 190.

In some cases, the post-reaction fluid collection system 450 may also include one or more of the materials 475 in a collection vessel to determine the compatibility of the one or more chemistry components on some or all of the materials 475 over a period of time. In other words, rather than the materials 475 being exposed to the fluid 437 on a relatively brief basis in testing vessel 472 in the reaction module 470, the some or all of the materials 475 may be exposed to some or all of the post-reaction fluid 457 (and more specifically, one or more of the chemistry components thereof) over a relatively longer period of time.

In certain example embodiments, the post-reaction fluid collection system 450 can, by collecting and analyzing the contents of the post-reaction fluid 457, determine the reaction of the fluid 437 with scales, fines, solids, rock, proppant, and/or other parts of the materials 475. Particle size analysis of the post-reaction fluid 457 may be included. With this information, the post-reaction fluid collection system 450 may characterize the fluid chemistry and the solid phase of the post-reaction fluid 457. The post-reaction fluid collection system 450 may also conduct one or more compatibility tests on the post-reaction fluid 457. Such compatibility tests may include, but are not limited to, fluid-rock-chemical compatibility tests and comparability tests of the post-reaction fluid 457 with water, oil, fluids, and/or chemicals injected into the volume 190 of the subterranean formation 110.

For example, for treatment of the volume 190 using a fluid 437 during fracturing at a completion stage of a field operation, compatibility tests may include, but are not limited to, a mixture of the post-reaction fluid 457 and crude oil (or other subterranean resource 111) with rock, a mixture of the post-reaction fluid 457 and crude oil without rock, a mixture of the post-reaction fluid 457 and displacement fluid with rock, a mixture of the post-reaction fluid 457 and displacement fluid without rock, a mixture of the post-reaction fluid 457 and the fracturing fluid with rock, a mixture of the post-reaction fluid 457 and the fracturing fluid without rock, a mixture of the post-reaction fluid 457 and the formation water with rock, a mixture of the post-reaction fluid 457 and the formation water without rock, a mixture of the post-reaction fluid 457 and the completion brine with rock, and a mixture of the post-reaction fluid 457 and the completion brine without rock.

As another example, for treatment of the volume 190 using a fluid 437 for production enhancement during the production stage of a field operation, compatibility tests may include, but are not limited to, a mixture of the post-reaction fluid 457 and crude oil (or other subterranean resource 111) with rock, a mixture of the post-reaction fluid 457 and crude oil (a type of subterranean resource 111) without rock, a mixture of the post-reaction fluid 457 and the formation water with rock, a mixture of the post-reaction fluid 457 and the formation water without rock, a mixture of the post-reaction fluid 457 and the completion brine with rock, and a mixture of the post-reaction fluid 457 and the completion brine without rock.

As yet another example, for treatment of the volume 190 using a fluid 437 for saltwater disposal (SWD) well injectivity enhancement of a field operation, compatibility tests may include, but are not limited to, a mixture of the post-reaction fluid 457 and the injection water with rock, a mixture of the post-reaction fluid 457 and the injection water without rock, a mixture of the post-reaction fluid 457 and the formation water with rock, and a mixture of the post-reaction fluid 457 and the formation water without rock.

As a more specific example, when the fluid 437 is or includes an acid, when the fluid 437 interacts with the materials 475, a byproduct of that reaction may be Fe'. When this occurs, the Fe' may cause fouling within the materials 475, which may close flow paths within the materials 475. When applied to the fractures 101 and rock within the volume 190 of the subterranean formation 110, the formation of Fe' may cause more blockage than what the fluid 437 is designed to clear.

Based on the compatibility tests and other analysis of the post-reaction fluid 457, the post-reaction fluid collection system 450 may conduct one or more integrated tests on the post-reaction fluid 457 (or components thereof, such as the one or more added chemistry components). Such integrated tests may result in determining what may react, be dissolved, and/or be mobilized and in determining reaction kinetics. This information may help to assess the impact (e.g., scale modeling results for fluid comingling scenarios) of the post-reaction fluid 457 (or components thereof) on scale, asphaltene, and/or other types of accumulations on the volume 190 in the subterranean formation 110 during well intervention, shutting in, and/or post-treatment production.

Based on the results integration and analysis, the post-reaction fluid collection system 450 may determine an optimized fluid 437 or stages of fluids 437 to be used downhole. For example, the post-reaction fluid collection system 450 may set and/or adjust the design and/or field treatment protocols of the volume 190 using a fluid 437 to optimize the efficiency of the well production performance. The post-reaction fluid collection system 450 may additionally consider the results from standard industry tests (e.g., re-gained permeability from core-flood tests) and other factors in determining well optimization. Well optimization may apply to one or more phases of a field operation, including but not limited to fluid (e.g., acid) treatment of fractures 101 at the completion stage of fracturing, fluid treatment as a special job for scales or fines removal, treatment using a fluid 437 for production enhancement during the production stage, and for SWD well injectivity enhancement.

One or more sensor devices 460 may be integrated with the reaction module 470 and the post-reaction fluid collection system 450. For example, two sensor devices 460 in the form of or including pressure sensors may be positioned before the testing vessel 472 and after the testing vessel 472 to provide a differential pressure value across the testing vessel 472. The differential pressure value may provide information as to, for example, a change in permeability, an accumulation of scale depositions 213, and/or plugging in the material 475. In some cases, in order to ensure that the post-reaction fluid collection system 450 receives the post-reaction fluid 457 from the reaction module 470 at an appropriate pressure, a pressure regulator (or other similar equipment) may be installed between the testing vessel 472 and the post-reaction fluid collection system 450.

The testing system 400 may include one or more controllers 404. A controller 404 of the testing system 400 communicates with and in some cases controls one or more of the other components (e.g., a sensor device 460, an injection system 438, the reaction module 470, the post-reaction fluid collection system 450) of the testing system 400. A controller 404 performs a number of functions that include obtaining and sending data, evaluating data, following protocols, running algorithms, and sending commands. A controller 404 may include one or more of a number of components. As discussed below with respect to FIG. 5, such components of a controller 404 may include, but are not limited to, a control engine, a communication module, a timer, a counter, a power module, a storage repository, a hardware processor, memory, a transceiver, an application interface, and a security module. When there are multiple controllers 404 (e.g., one controller 404 for one or more injection systems 438, another controller 404 for the reaction module 470, yet another controller 404 for the post-reaction fluid collection system 450), each controller 404 may operate independently of each other. Alternatively, one or more of the controllers 404 may work cooperatively with each other. As yet another alternative, one of the controllers 404 may control some or all of one or more other controllers 404 in the testing system 400. Each controller 404 may be considered a type of computer device, as discussed below with respect to FIG. 6.

Each sensor device 460 includes one or more sensors that measure one or more parameters (e.g., pressure, flow rate, temperature, humidity, fluid content, voltage, current, permeability, porosity, rock characteristics, chemical elements in a fluid, chemical elements in a solid). Examples of a sensor of a sensor device 460 may include, but are not limited to, a temperature sensor, a flow sensor, a pressure sensor, a gas spectrometer, a voltmeter, an ammeter, a permeability meter, a porosimeter, and a camera. A sensor device 460 may be integrated with or measure a parameter associated with one or more components of the testing system 400. For example, a sensor device 460 may be configured to measure a parameter (e.g., flow rate, pressure, temperature) of a fluid component 427, a fluid 437, and/or a post-reaction fluid 457 flowing through the piping 488 at a particular location (e.g., between a fluid component source 428 and a corresponding injection system 438, between the header 489 and the reaction module 470, between the reaction module 470 and the post-reaction fluid collection system 450).

As another example, a sensor device 460 may be configured to determine how open or closed a valve 485 within the testing system 400 is. As yet another example, one or more sensor devices 460 may be used to identify an amount of scale depositions 213 that has accumulated on proppant 112 in a testing vessel 472. As still another example, one or more sensor devices 460 may be used to identify a chemistry composition (e.g., one or more different chemistry components in the post-reaction fluid 457 that are not in the fluid 437, one or more of the same chemistry components with different concentrations in the post-reaction fluid 457 relative to the concentrations in the fluid 437) in the post-reaction fluid 457 that differs from the chemistry composition of the fluid 437 before flowing through the materials 475. In some cases, a number of sensor devices 460, each measuring a different parameter, may be used in combination to determine and confirm whether a controller 404 should take a particular action (e.g., operate a valve 485, operate or adjust the operation of the post-reaction fluid collection system 450). When a sensor device 460 includes its own controller 404 (or portions thereof), then the sensor device 460 may be considered a type of computer device, as discussed below with respect to FIG. 6.

A user 451 may be any person that interacts, directly or indirectly, with a controller 404 and/or any other component of the testing system 400. Examples of a user 451 may include, but are not limited to, a business owner, an engineer, a company representative, a geologist, a consultant, a drilling engineer, a contractor, and a manufacturer's representative. A user 451 may use one or more user systems 455, which may include a display (e.g., a GUI). A user system 455 of a user 451 may interact with (e.g., send data to, obtain data from) the controller 404 via an application interface and using the communication links 405. The user 451 may also interact directly with the controller 404 through a user interface (e.g., keyboard, mouse, touchscreen).

The network manager 480 is a device or component that controls all or a portion (e.g., a communication network, the controller 404) of the testing system 400. The network manager 480 may be substantially similar to the controller 404, as described above. For example, the network manager 480 may include a controller that has one or more components and/or similar functionality to some or all of the controller 404. Alternatively, the network manager 480 may include one or more of a number of features in addition to, or altered from, the features of the controller 404. As described herein, control and/or communication with the network manager 480 may include communicating with one or more other components of the same testing system 400 or another system. In such a case, the network manager 480 may facilitate such control and/or communication. The network manager 480 may be called by other names, including but not limited to a master controller, a network controller, and an enterprise manager. The network manager 480 may be considered a type of computer device, as discussed below with respect to FIG. 6.

Interaction between each controller 404, the sensor devices 460, the users 451 (including any associated user systems 455), the network manager 480, and other components (e.g., the valves 485, an injection system 438, the reaction module 470, and the post-reaction fluid collection system 450) of the testing system 400 may be conducted using communication links 405 and/or power transfer links 487. Each communication link 405 may include wired (e.g., Class 1 electrical cables, Class 2 electrical cables, electrical connectors, Power Line Carrier, RS485) and/or wireless (e.g., Wi-Fi, Zigbee, visible light communication, cellular networking, Bluetooth, Bluetooth Low Energy (BLE), ultra-wide band (UWB), WirelessHART, ISA100) technology. A communication link 405 may transmit signals (e.g., communication signals, control signals, data) between each controller 404, the sensor devices 460, the users 451 (including any associated user systems 455), the network manager 480, and the other components of the testing system 400.

Each power transfer link 487 may include one or more electrical conductors, which may be individual or part of one or more electrical cables. In some cases, as with inductive power, power may be transferred wirelessly using power transfer links 487. A power transfer link 487 may transmit power between each controller 404, the sensor devices 460, the users 451 (including any associated user systems 455), the network manager 480, and the other components of the testing system 400. Each power transfer link 487 may be sized (e.g., 12 gauge, 18 gauge, 4 gauge) in a manner suitable for the amount (e.g., 480V, 24V, 120V) and type (e.g., alternating current, direct current) of power transferred therethrough.

Figure 5:
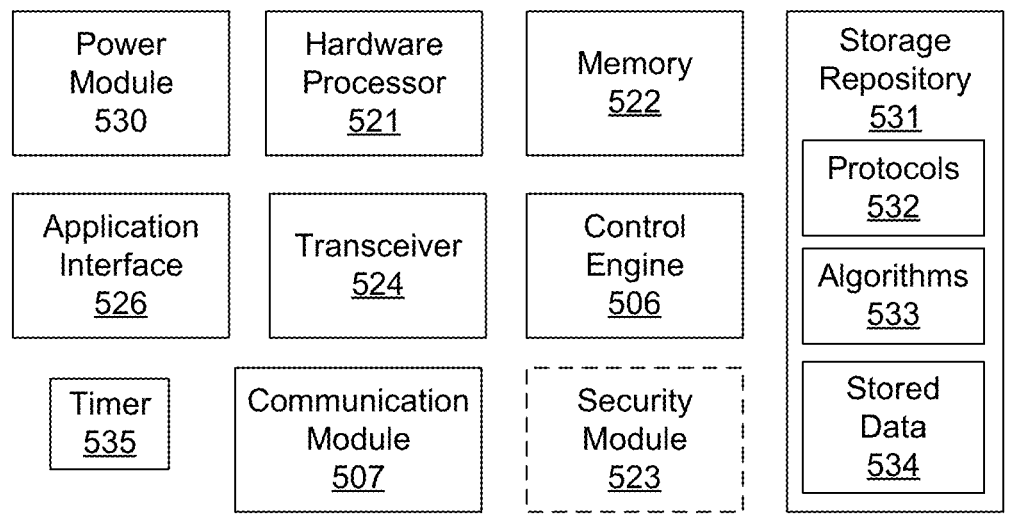
FIG. 5 shows a system diagram of a controller according to certain example embodiments.

FIG. 5 shows a system diagram of a controller 404 according to certain example embodiments. Referring to FIGS. 1A through 5, the controller 404 may be substantially the same as a controller 404 discussed above with respect to FIG. 4. The controller 404 includes multiple components. In this case, the controller 404 of FIG. 5 includes a control engine 506, a communication module 507, a timer 535, a power module 530, a storage repository 531, a hardware processor 521, a memory 522, a transceiver 524, an application interface 526, and, optionally, a security module 523. The controller 404 (or components thereof) may be located at or near the various components of the testing system 400. In addition, or in the alternative, the controller 404 (or components thereof) may be located remotely from (e.g., in the cloud, at an office building) the various components of the testing system 400.

The storage repository 531 may be a persistent storage device (or set of devices) that stores software and data used to assist the controller 404 in communicating with one or more other components of a system, such as the users 451 (including associated user systems 455), each injection system 438, the reaction module 470, each post-reaction fluid collection system 450, the network manager 480, and the sensor devices 460 of the testing system 400 of FIG. 4 above. In one or more example embodiments, the storage repository 531 stores one or more protocols 532, algorithms 533, and stored data 534.

The protocols 532 of the storage repository 531 may be any procedures (e.g., a series of method steps) and/or other similar operational processes that the control engine 506 of the controller 404 follows based on certain conditions at a point in time. The protocols 532 may include any of a number of communication protocols that are used to send and/or obtain data between the controller 404 and other components of a system (e.g., testing system 400). Such protocols 532 used for communication may be a time-synchronized protocol. Examples of such time-synchronized protocols may include, but are not limited to, a highway addressable remote transducer (HART) protocol, a wirelessHART protocol, and an International Society of Automation (ISA) 100 protocol. In this way, one or more of the protocols 532 may provide a layer of security to the data transferred within a system (e.g., testing system 400). Other protocols 532 used for communication may be associated with the use of Wi-Fi, Zigbee, visible light communication (VLC), cellular networking, BLE, UWB, and Bluetooth.

The algorithms 533 may be any formulas, mathematical models, forecasts, simulations, and/or other similar tools that the control engine 506 of the controller 404 uses to reach a computational conclusion. For example, one or more algorithms 533 may be used, in conjunction with one or more protocols 532, to assist the controller 404 to determine when to start, adjust, and/or stop the operation of the reaction module 470 and/or the post-reaction fluid collection system 450. As another example, one or more algorithms 533 may be used, in conjunction with one or more protocols 532, to assist the controller 404 to determine when to start, adjust, and/or stop the operation of an injection system 438. As yet another example, one or more algorithms 533 may be used, in conjunction with one or more protocols 532, to assist the controller 404 to identify an optimal formulation of a fluid to reduce or eliminate scale depositions 213 on proppant 112 within a testing vessel 472. As still another example, one or more algorithms 533 may be used, in conjunction with one or more protocols 532, to assist the controller 404 in identifying one or more chemistry components in the post-reaction fluid 457 that are not present in the fluid 437 before flowing through the materials 475 and evaluating the effect of those one or more chemistry components on some or all of the materials 475 over time.

An example of an algorithm 533 is represented by the formula: $Q=[kA(P_i-P_o)] \div \mu L$, where Q is a flow rate (in cm$^3$/s), $P_i$ is inlet fluid pressure (in Pa), $P_o$ is outlet fluid pressure (in Pa), μ is dynamic viscosity of the fluid (poise or Pa. S), L is the length of the material in the testing vessel 472 (in cm), k is the permeability of the materials 475 in the testing vessel 472 (in cm$^2$), and A is the area of the k is the permeability of the materials 475 in the testing vessel 472 (in md).

Stored data 534 may be any data associated with a field (e.g., the subterranean formation 110, the induced fractures 101 within the volume 190 adjacent to a wellbore 120, the characteristics of proppant 112 used in a field operation), other fields (e.g., other wellbores and subterranean formations), the other components (e.g., the user systems 455, the reaction module 470, the materials 475 in the testing vessel 472, the post-reaction fluid collection system 450), including associated equipment (e.g., motors, pumps, compressors), of the testing system 400, measurements made by the sensor devices 460, threshold values, tables, results of previously run or calculated algorithms 533, updates to protocols 532, user preferences, and/or any other suitable data. Such data may be any type of data, including but not limited to historical data, present data, and future data (e.g., forecasts). The stored data 534 may be associated with some measurement of time derived, for example, from the timer 535.

Examples of a storage repository 531 may include, but are not limited to, a database (or a number of databases), a file system, cloud-based storage, a hard drive, flash memory, some other form of solid-state data storage, or any suitable combination thereof. The storage repository 531 may be located on multiple physical machines, each storing all or a portion of the communication protocols 532, the algorithms 533, and/or the stored data 534 according to some example embodiments. Each storage unit or device may be physically located in the same or in a different geographic location.

The storage repository 531 may be operatively connected to the control engine 506. In one or more example embodiments, the control engine 506 includes functionality to communicate with the users 451 (including associated user systems 455), the sensor devices 460, the network manager 480, and the other components in the testing system 400. More specifically, the control engine 506 sends information to and/or obtains information from the storage repository 531 in order to communicate with the users 451 (including associated user systems 455), the sensor devices 460, the network manager 480, and the other components of the testing system 400. As discussed below, the storage repository 531 may also be operatively connected to the communication module 507 in certain example embodiments.

In certain example embodiments, the control engine 506 of the controller 404 controls the operation of one or more components (e.g., the communication module 507, the timer 535, the transceiver 524) of the controller 404. For example, the control engine 506 may activate the communication module 507 when the communication module 507 is in "sleep" mode and when the communication module 507 is needed to send data obtained from another component (e.g., a sensor device 460) in the testing system 400. In addition, the control engine 506 of the controller 404 may control the operation of one or more other components (e.g., the reaction module 470, the post-reaction fluid collection system 450, an injection system 438), or portions thereof, of the testing system 400.

The control engine 506 of the controller 404 may communicate with one or more other components of the testing system 400. For example, the control engine 506 may use one or more protocols 532 to facilitate communication with the sensor devices 460 to obtain data (e.g., measurements of various parameters, such as temperature, pressure, and flow rate), whether in real time or on a periodic basis and/or to instruct a sensor device 460 to take a measurement. The control engine 506 may use measurements of parameters taken by sensor devices 460 while a post-reaction fluid 457 flows from the reaction module 470 to the post-reaction fluid collection system 450, as well as one or more protocols 532 and/or algorithms 533, to analyze the contents of the post-reaction fluid 457. As yet another example, the control engine 506 may use one or more algorithms 533 and/or protocols 532 to recommend a change to the formulation (e.g., adding a fluid component 427, removing a fluid component 427, increasing an amount of a fluid component 427, decreasing an amount of a fluid component 427) of a fluid 437, based on the analysis of a prior post-reaction fluid 457, in an attempt to optimize operational capability in a particular stage of a field operation.

The control engine 506 may generate and process data associated with control, communication, and/or other signals sent to and obtained from the users 451 (including associated user systems 455), the sensor devices 460, the network manager 480, and the other components of the testing system 400. In certain embodiments, the control engine 506 of the controller 404 may communicate with one or more components of a system external to the testing system 400. For example, the control engine 506 may interact with an inventory management system by ordering replacements for components or pieces of equipment (e.g., a sensor device 460, a valve 485, a motor) within the testing system 400 that has failed or is failing. As another example, the control engine 506 may interact with a contractor or workforce scheduling system by arranging for the labor needed to replace a component or piece of equipment in the testing system 400. In this way and in other ways, the controller 404 is capable of performing a number of functions beyond what could reasonably be considered a routine task.

In certain example embodiments, the control engine 506 may include an interface that enables the control engine 506 to communicate with the sensor devices 460, the user systems 455, the network manager 480, and the other components of the testing system 400. For example, if a user system 455 operates under IEC Standard 62386, then the user system 455 may have a serial communication interface that will transfer data to the controller 404. Such an interface may operate in conjunction with, or independently of, the protocols 532 used to communicate between the controller 404 and the users 451 (including corresponding user systems 455), the sensor devices 460, the network manager 480, and the other components of the testing system 400.

The control engine 506 (or other components of the controller 404) may also include one or more hardware components and/or software elements to perform its functions. Such components may include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 507 of the controller 404 determines and implements the communication protocol (e.g., from the protocols 532 of the storage repository 531) that is used when the control engine 506 communicates with (e.g., sends signals to, obtains signals from) the user systems 455, the sensor devices 460, the network manager 480, and the other components of the testing system 400. In some cases, the communication module 507 accesses the stored data 534 to determine which communication protocol is used to communicate with another component of the testing system 400. In addition, the communication module 507 may identify and/or interpret the communication protocol of a communication obtained by the controller 404 so that the control engine 506 may interpret the communication. The communication module 507 may also provide one or more of a number of other services with respect to data sent from and obtained by the controller 404. Such services may include, but are not limited to, data packet routing information and procedures to follow in the event of data interruption.

The timer 535 of the controller 404 may track clock time, intervals of time, an amount of time, and/or any other measure of time. The timer 535 may also count the number of occurrences of an event, whether with or without respect to time. Alternatively, the control engine 506 may perform a counting function. The timer 535 is able to track multiple time measurements and/or count multiple occurrences concurrently. The timer 535 may track time periods based on an instruction obtained from the control engine 506, based on an instruction obtained from a user 451, based on an instruction programmed in the software for the controller 404, based on some other condition (e.g., the occurrence of an event) or from some other component, or from any combination thereof. In certain example embodiments, the timer 535 may provide a time stamp for each packet of data obtained from another component (e.g., a sensor device 460) of the testing system 400.

The power module 530 of the controller 404 obtains power from a power supply (e.g., AC mains) and manipulates (e.g., transforms, rectifies, inverts) that power to provide the manipulated power to one or more other components (e.g., the timer 535, the control engine 506) of the controller 404, where the manipulated power is of a type (e.g., alternating current, direct current) and level (e.g., 12V, 24V, 120V) that may be used by the other components of the controller 404. In some cases, the power module 530 may also provide power to one or more of the sensor devices 460.

The power module 530 may include one or more of a number of single or multiple discrete components (e.g., transistor, diode, resistor, transformer) and/or a microprocessor. The power module 530 may include a printed circuit board, upon which the microprocessor and/or one or more discrete components are positioned. In addition, or in the alternative, the power module 530 may be a source of power in itself to provide signals to the other components of the controller 404. For example, the power module 530 may be or include an energy storage device (e.g., a battery). As another example, the power module 530 may be or include a localized photovoltaic power system.

The hardware processor 521 of the controller 404 executes software, algorithms (e.g., algorithms 533), and firmware in accordance with one or more example embodiments. Specifically, the hardware processor 521 may execute software on the control engine 506 or any other portion of the controller 404, as well as software used by the users 451 (including associated user systems 455), the network manager 480, and/or other components of the testing system 400. The hardware processor 521 may be an integrated circuit, a central processing unit, a multi-core processing chip, SoC, a multi-chip module including multiple multi-core processing chips, or other hardware processor in one or more example embodiments. The hardware processor 521 may be known by other names, including but not limited to a computer processor, a microprocessor, and a multi-core processor.

In one or more example embodiments, the hardware processor 521 executes software instructions stored in memory 522. The memory 522 includes one or more cache memories, main memory, and/or any other suitable type of memory. The memory 522 may include volatile and/or non-volatile memory. The memory 522 may be discretely located within the controller 404 relative to the hardware processor 521. In certain configurations, the memory 522 may be integrated with the hardware processor 521.

In certain example embodiments, the controller 404 does not include a hardware processor 521. In such a case, the controller 404 may include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 404 (or portions thereof) to be programmable and function according to certain logic rules and thresholds without the use of a hardware processor. Alternatively, FPGAs, IGBTs, ICs, and/or similar devices may be used in conjunction with one or more hardware processors 521.

The transceiver 524 of the controller 404 may send and/or obtain control and/or communication signals. Specifically, the transceiver 524 may be used to transfer data between the controller 404 and the users 451 (including associated user systems 455), the sensor devices 460, the network manager 480, and the other components of the testing system 400. The transceiver 524 may use wired and/or wireless technology. The transceiver 524 may be configured in such a way that the control and/or communication signals sent and/or obtained by the transceiver 524 may be obtained and/or sent by another transceiver that is part of a user system 455, a sensor device 460, the network manager 480, and/or another component of the testing system 400. The transceiver 524 may send and/or obtain any of a number of signal types, including but not limited to radio frequency signals.

When the transceiver 524 uses wireless technology, any type of wireless technology may be used by the transceiver 524 in sending and obtaining signals. Such wireless technology may include, but is not limited to, Wi-Fi, Zigbee, VLC, cellular networking, BLE, UWB, and Bluetooth. The transceiver 524 may use one or more of any number of suitable communication protocols (e.g., ISA100, HART) when sending and/or obtaining signals.

Optionally, in one or more example embodiments, the security module 523 secures interactions between the controller 404, the users 451 (including associated user systems 455), the sensor devices 460, the network manager 480, and the other components of the testing system 400. More specifically, the security module 523 authenticates communication from software based on security keys verifying the identity of the source of the communication. For example, user software may be associated with a security key enabling the software of a user system 455 to interact with the controller 404. Further, the security module 523 may restrict receipt of information, requests for information, and/or access to information.

A user 451 (including an associated user system 455), the sensor devices 460, the network manager 480, and the other components of the testing system 400 may interact with the controller 404 using the application interface 526. Specifically, the application interface 526 of the controller 404 obtains data (e.g., information, communications, instructions, updates to firmware) from and sends data (e.g., information, communications, instructions) to the user systems 455 of the users 451, the sensor devices 460, the network manager 480, and/or the other components of the testing system 400. Examples of an application interface 526 may be or include, but are not limited to, an application programming interface, a web service, a data protocol adapter, some other hardware and/or software, or any suitable combination thereof. Similarly, the user systems 455 of the users 451, the sensor devices 460, the network manager 480, and/or the other components of the testing system 400 may include an interface (similar to the application interface 526 of the controller 404) to obtain data from and send data to the controller 404 in certain example embodiments.

In addition, as discussed above with respect to a user system 455 of a user 451, one or more of the sensor devices 460, the network manager 480, and/or one or more of the other components of the testing system 400 may include a user interface. Examples of such a user interface may include, but are not limited to, a graphical user interface, a touchscreen, a keyboard, a monitor, a mouse, some other hardware, or any suitable combination thereof.

The controller 404, the users 451 (including associated user systems 455), the sensor devices 460, the network manager 480, and the other components of the testing system 400 may use their own system or share a system in certain example embodiments. Such a system may be, or contain a form of, an Internet-based or an intranet-based computer system that is capable of communicating with various software. A computer system includes any type of computing device and/or communication device, including but not limited to the controller 404. Examples of such a system may include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system may correspond to a computer system as described below with regard to FIG. 6.

Further, as discussed above, such a system may have corresponding software (e.g., user system software, sensor device software, controller software). The software may execute on the same or a separate device (e.g., a server, mainframe, desktop personal computer (PC), laptop, PDA, television, cable box, satellite box, kiosk, telephone, mobile phone, or other computing devices) and may be coupled by the communication network (e.g., Internet, Intranet, Extranet, LAN, WAN, or other network communication methods) and/or communication channels, with wire and/or wireless segments according to some example embodiments. The software of one system may be a part of, or operate separately but in conjunction with, the software of another system within the testing system 400.

Figure 6:
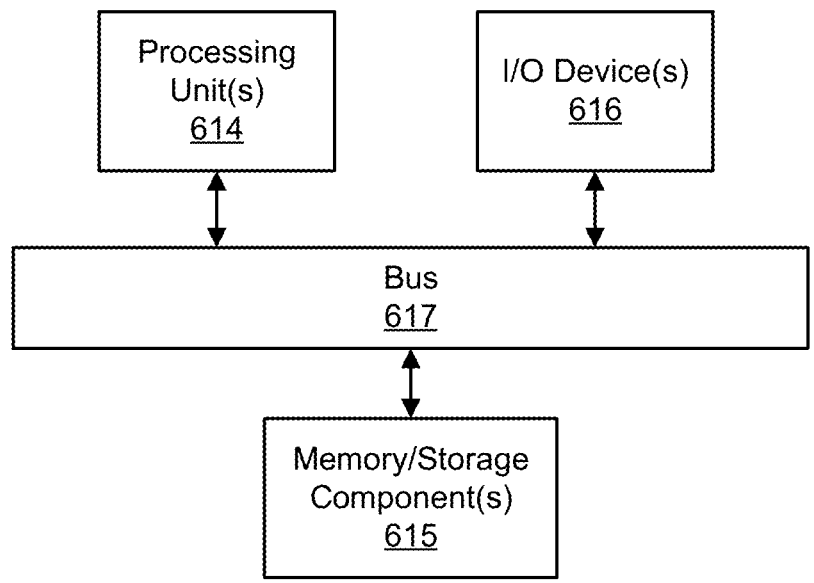
FIG. 6 shows a computing device in accordance with certain example embodiments.

FIG. 6 illustrates one embodiment of a computing device 618 that implements one or more of the various techniques described herein, and which is representative, in whole or in part, of the elements described herein pursuant to certain example embodiments. For example, a controller 404 (including components thereof, such as a control engine 506, a hardware processor 520, a storage repository 531, a power module 530, and a transceiver 524) may be considered a computing device 618. Computing device 618 is one example of a computing device and is not intended to suggest any limitation as to scope of use or functionality of the computing device and/or its possible architectures. Neither should the computing device 618 be interpreted as having any dependency or requirement relating to any one or combination of components illustrated in the example computing device 618.

The computing device 618 includes one or more processors or processing units 614, one or more memory/storage components 615, one or more input/output (I/O) devices 616, and a bus 617 that allows the various components and devices to communicate with one another. The bus 617 represents one or more of any of several types of bus structures, including a memory bus or memory controller, a peripheral bus, an accelerated graphics port, and a processor or local bus using any of a variety of bus architectures. The bus 617 includes wired and/or wireless buses.

The memory/storage component 615 represents one or more computer storage media. The memory/storage component 615 includes volatile media (such as random access memory (RAM)) and/or nonvolatile media (such as read only memory (ROM), flash memory, optical disks, magnetic disks, and so forth). The memory/storage component 615 includes fixed media (e.g., RAM, ROM, a fixed hard drive, etc.) as well as removable media (e.g., a Flash memory drive, a removable hard drive, an optical disk, and so forth).

One or more I/O devices 616 allow a user 451 to enter commands and information to the computing device 618, and also allow information to be presented to the user 160 and/or other components or devices. Examples of input devices 616 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 618 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 618 includes at least the minimal processing, input, and/or output means necessary to practice one or more embodiments.

Further, those skilled in the art will appreciate that one or more elements of the aforementioned computer device 618 is located at a remote location and connected to the other elements over a network in certain example embodiments.

Further, one or more embodiments is implemented on a distributed system having one or more nodes, where each portion of the implementation (e.g., an injection system 438, the reaction module 470, the post-reaction fluid collection system 450) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 7:
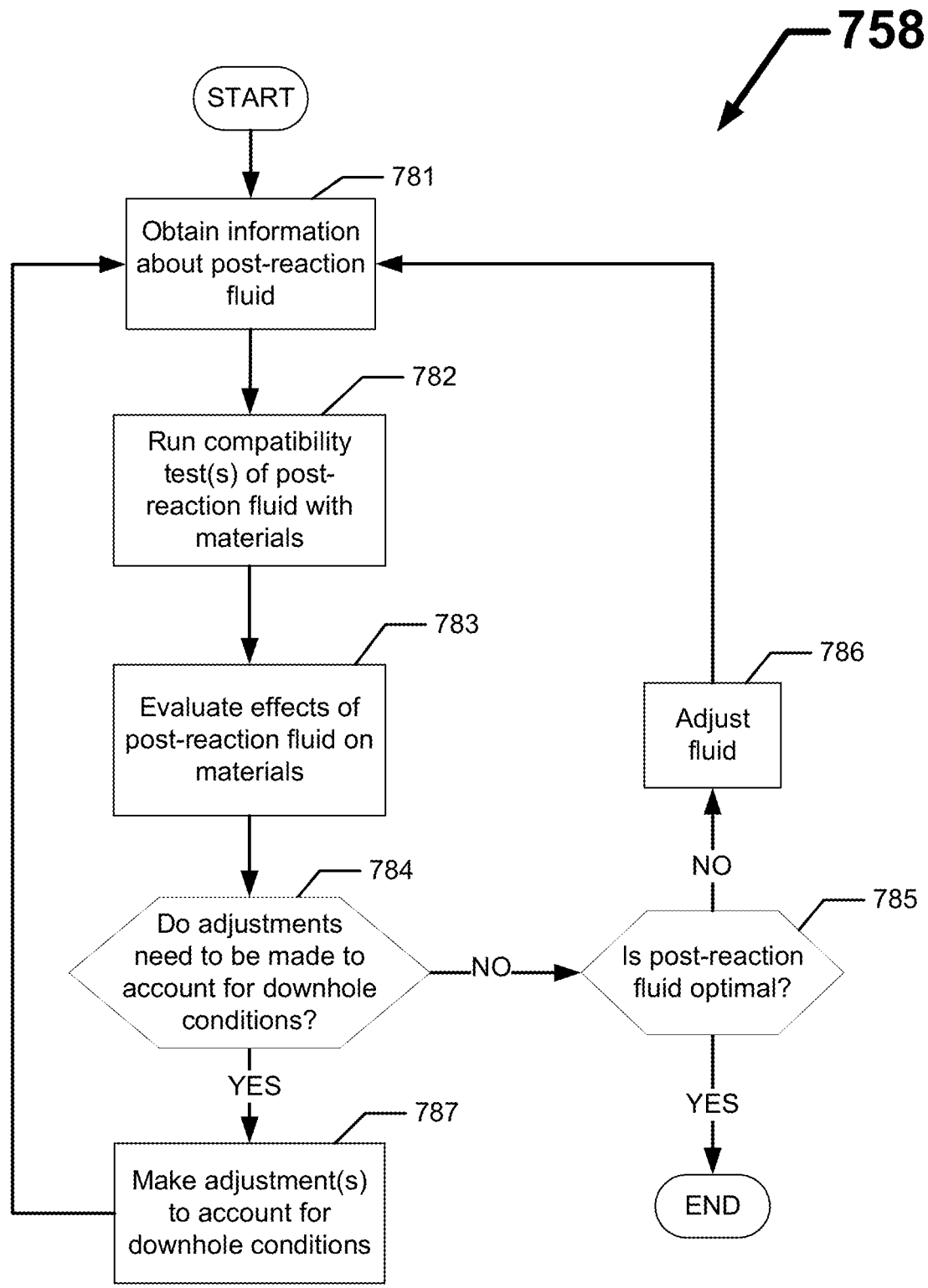
FIG. 7 shows a flowchart of a method for optimizing chemical treatment at the subsurface for improved well performance according to certain example embodiments.

FIG. 7 shows a flowchart 758 of a method for optimizing chemical treatment at the subsurface for improved well performance according to certain example embodiments. While the various steps in this flowchart 758 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 7 may be included in performing this method. Accordingly, the specific arrangement of steps should not be construed as limiting the scope. Further, a particular computing device, such as the computing device 618 discussed above with respect to FIG. 6, may be used to perform one or more of the steps for the methods shown in FIG. 7 in certain example embodiments. Any of the functions performed below by a controller 404 may involve the use of one or more protocols 532, one or more algorithms 533, and/or stored data 534 stored in a storage repository 531. In addition, or in the alternative, any of the functions in the method may be performed by a user (e.g., user 451).

The method shown in FIG. 7 is merely an example that may be performed by using an example system described herein. In other words, systems for optimizing chemical treatment at the subsurface for improved well performance may perform other functions using other methods in addition to and/or aside from those shown in FIG. 7. Referring to FIGS. 1A through 7, the method shown in the flowchart 758 of FIG. 7 begins at the START step and proceeds to step 781, where information about the post-reaction fluid 457 is obtained. As used herein, the term "obtaining" may include receiving, retrieving, accessing, generating, etc. or any other manner of obtaining the information. The post-reaction fluid 457 is disposed in the post-reaction fluid collection system 450. The post-reaction fluid 457 is a fluid 437 that has potentially been modified (e.g., the addition of one or more chemistry components) by the interaction of the fluid 437 with the materials 475 in a testing vessel 472 of the reaction module 470.

The information may be obtained by a controller 404 (or an obtaining component thereof), which may include the controller 404 of FIG. 5 above, using one or more algorithms 533 and/or one or more protocols 532. The information may be obtained from a user 451, including an associated user system 455. In addition, or in the alternative, the information may be obtained from one or more sensor devices 460 that measure various parameters. Examples of the information obtained may include, but are not limited to, a composition of the post-reaction fluid 457, a temperature of the post-reaction fluid 457, a pressure of the post-reaction fluid 457, a composition of the fluid 437, and a composition (e.g., field scale deposits, simulated scale deposits, cement debris, filtered solids from produced fluids, proppant rock) of the materials 475 within the testing vessel 472 before and/or after the materials 475 are exposed to the fluid 437.

Other information that may be obtained may include a reaction time of the fluid 437 with the materials 475, as well as a design configuration of the materials 475 and the reaction module 470. Yet other information that may be obtained may include an analysis of the dissolved ions or elements of the materials 475 and/or the post-reaction fluid 457, the pH and other chemistry characteristics of the post-reaction fluid 457, and the mass and percentage of dissolved solid phases after the reaction between the fluid 437 and the materials 475. In certain example embodiments, the materials 475 include rock and proppant, and the materials 475 are designed to be representative of the fractured subterranean formation 110 adjacent to the wellbore 120. The information may be obtained at one time (e.g., prior to testing), over a period of time, periodically, or on some other basis. The information may be currently obtained data. In addition, or in the alternative, the data may be historical (e.g., data obtained from a prior field operation of the subterranean formation 110).

The fluid 437 may be made up of multiple fluid components 427. Each fluid component 427 of a fluid 437 may be drawn from a fluid component source 428 using an associated injection system 438 and piping 488. The fluid 437 may be provided to flow through the materials 475 in a testing vessel 472 using one or more injection systems 438 or an independent pumping system. The fluid components 427 of the fluid 437 may mix together naturally in a header 489 of the piping 488 and/or using a mixing module 465. A fluid 437 may be or include, or a fluid component 427 may be, an acid (e.g., HCl (hydrochloric acid), $CH_3COOH$ (acetic acid), $CH_2O_2$ (formic acid), HF (hydrofluoric acid), boric acid, etc.), a chelant, and/or some other chemical compound.

The composition (also sometimes referred to as the chemistry composition herein) of the fluid 437 may be known by a controller 404. The composition of the fluid 437 may include a specific identification of each fluid component 427 and the amount (e.g., 10 ppm, mg/L) of each fluid component 427. For example, a user 451, including an associated user system 455, may communicate the composition of the fluid 437 to the controller 404. As another example, a controller 404, using one or more protocols 532 and/or one or more algorithms 533, may determine the composition of a fluid 437 that may be tested. In such a case, a controller 404 may communicate, using one or more protocols 532, this composition to a user 451 so that the user 451 may manipulate the appropriate fluid component sources 428 and associated injection systems 438 to attain the desired fluid 437. Alternatively, a controller 404 may manipulate, using one or more algorithms 533 and/or one or more protocols 532, the appropriate fluid component sources 428 and associated injection systems 438 to attain the desired fluid 437. The fluid 437 flows through the materials 475 in the testing vessel 472 continually over a period of time (e.g., hours, days, months).

In certain example embodiments, a controller 404 may also set and/or control the environment to which the materials 475 in the testing vessel 472 are exposed using one or more algorithms 533 and/or one or more protocols 532. For example, if a goal of the testing is to subject the materials 475 in the testing vessel 472 to conditions found in the subterranean formation 110, then the controller 404 may accordingly control factors such as the temperature and the pressure applied to the testing vessel 472.

A chemistry component may be a chemical element or chemical compound that is in the post-reaction fluid 457 but was not present in the fluid 437 that interacted with the materials 475 to generate the post-reaction fluid 457 or that has a different concentration in the post-reaction fluid 457 compared to the concentration in the initial fluid 437. The post-reaction fluid 457 may have a chemistry composition having one or more chemistry components. A controller 404 may be configured to identify and quantify, using measurements made by one or more sensor devices 460, one or more algorithms 533, and/or one or more protocols 532, any chemistry components in the post-reaction fluid 457.

In step 782, one or more compatibility tests of the post-reaction fluid 457 are run with some or all of the materials 475. Some or all of a compatibility test may be based on the information obtained about the post-reaction fluid 457 in step 781. For example, factors such as time, concentration of the post-reaction fluid 457, amount of the materials 475, type of testing vessel 472 used, parameters measured, particular sensor devices 460 used to measure parameters, and conditions (e.g., temperature, pressure) applied to a testing vessel 472 may be derived from information obtained about the post-reaction fluid 457.

Each compatibility test may be selected and run by a controller 404 using one or more algorithms 533 and/or one or more protocols 532. A compatibility test may be selected and run based on one or more of a number of factors, including but not limited to a stage (e.g., completion stage, production stage) of a field operation, the one or more chemistry components added to the post-reaction fluid 457 relative to the fluid 437, and the components of the material 475. A compatibility test may be performed in one or more testing vessels 472 (e.g., a column, a bottle, a test tube). A compatibility test may be configured as a coreflood test setup.

Figure 15:
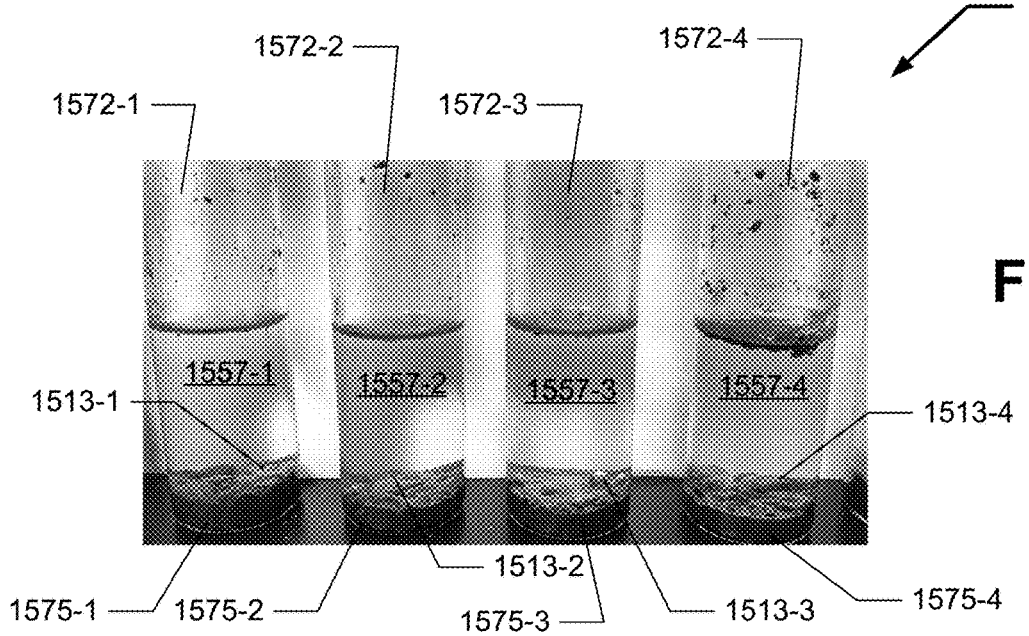
FIG. 15 shows several testing vessels of a reaction module according to certain example embodiments.
Figure 16:
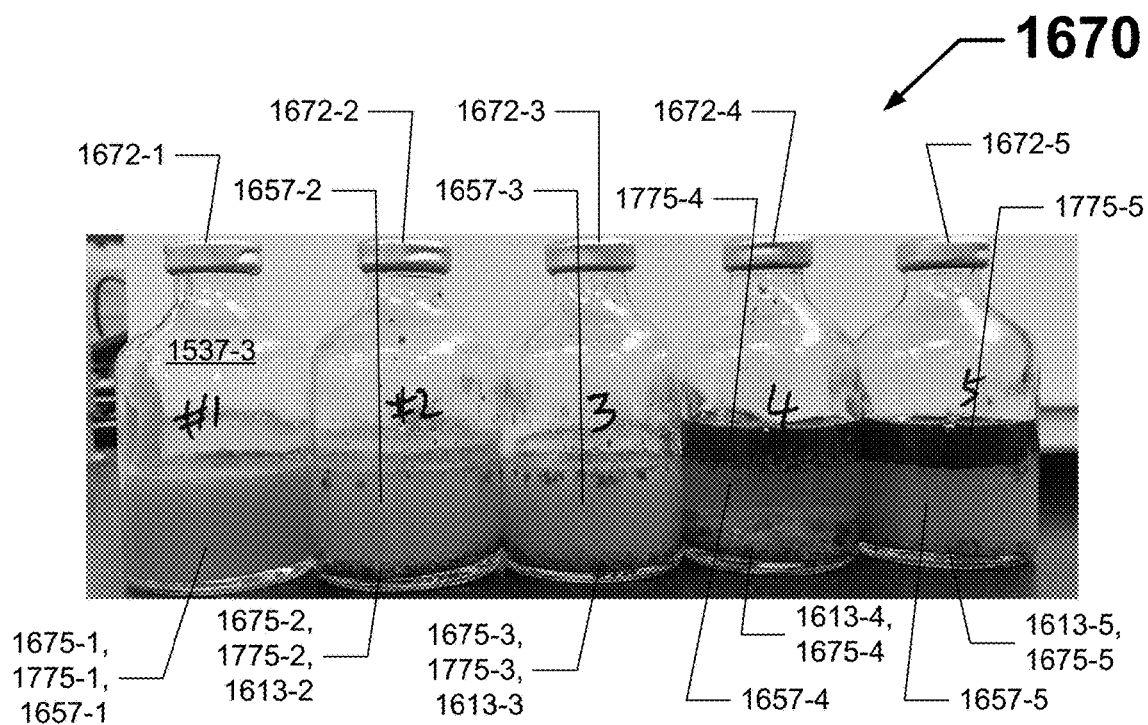
FIG. 16 shows several testing vessels of another reaction module according to certain example embodiments.

A compatibility test may be used to evaluate whether there are negative impacts when substances (e.g., emulsion formation when oil and aqueous phase mix, solid precipitation) are mixed, when fluids and chemicals (e.g., friction reducer, surfactants, scale inhibitor) mix, and/or when precipitation on rock surfaces when fluid and rock (e.g., cutting samples) mix. In some cases, compatibility tests may be conducted in testing vessels 472 in the form of bottles (as shown in FIGS. 15 and 16 below) under target temperatures. If there is sign of reaction (e.g., precipitation formation, fluid color change, gas bubble generation, etc.), the tested components may be deemed as compatible. A decrease in permeability during a compatibility test may be a sign of incompatibility.

A compatibility test may be conducted entirely within the post-reaction fluid collection system 450. Alternatively, a compatibility test may be conducted additionally using the reaction module 470. In such a case, the post-reaction fluid 457 of a previous test may be used as a fluid 437 in a subsequent test using the testing system 400. A compatibility test may involve one component, some components, or all of the components of the post-reaction fluid 457 and/or one component, some components, or all of the components of the materials 475.

As discussed above, for treatment of the volume 190 using a fluid 437 during fracturing at a completion stage of a field operation, compatibility tests may include, but are not limited to, a mixture of the post-reaction fluid 457 and crude oil (or other subterranean resource 111) with rock, a mixture of the post-reaction fluid 457 and crude oil without rock, a mixture of the post-reaction fluid 457 and displacement fluid with rock, a mixture of the post-reaction fluid 457 and displacement fluid without rock, a mixture of the post-reaction fluid 457 and the fracturing fluid with rock, a mixture of the post-reaction fluid 457 and the fracturing fluid without rock, a mixture of the post-reaction fluid 457 and the formation water with rock, a mixture of the post-reaction fluid 457 and the formation water without rock, a mixture of the post-reaction fluid 457 and the completion brine with rock, and a mixture of the post-reaction fluid 457 and the completion brine without rock.

As another example, for treatment of the volume 190 using a fluid 437 for production enhancement during the production stage of a field operation, compatibility tests may include, but are not limited to, a mixture of the post-reaction fluid 457 and crude oil (or other subterranean resource 111) with rock, a mixture of the post-reaction fluid 457 and crude oil (a type of subterranean resource 111) without rock, a mixture of the post-reaction fluid 457 and the formation water with rock, a mixture of the post-reaction fluid 457 and the formation water without rock, a mixture of the post-reaction fluid 457 and the completion brine with rock, and a mixture of the post-reaction fluid 457 and the completion brine without rock.

As yet another example, for treatment of the volume 190 using a fluid 437 for SWD well injectivity enhancement of a field operation, compatibility tests may include, but are not limited to, a mixture of the post-reaction fluid 457 and the injection water with rock, a mixture of the post-reaction fluid 457 and the injection water without rock, a mixture of the post-reaction fluid 457 and the formation water with rock, and a mixture of the post-reaction fluid 457 and the formation water without rock.

In step 783, the effects of the post-reaction fluid 457 on the materials 475 are evaluated. Some or all of the effects may be based on, for example, parameters measured by one or more sensor devices 460 and provided to a controller 404. Some or all of the effects may be evaluated by a controller 404 using one or more algorithms 533 and/or one or more protocols 532. Examples of some effects may include, but are not limited to, the loss of a component (e.g., scale, proppant) of the materials 475, the addition of a component (e.g., scale) in the materials 475, the addition of a chemistry component (e.g., Fe, Ca, Si, etc.) in the post-reaction fluid 457 relative to the fluid 437, a change in the permeability of the materials 475 in the testing vessel 472, a change in the porosity of the materials 475 in the testing vessel 472, and a change in the pH of the post-reaction fluid 457. In some cases, the effects may be compared to expected values or results.

The post-reaction fluid 457 from a compatibility test and/or the effects of the post-reaction fluid 457 on the materials 475 during a compatibility test may be evaluated and characterized in any of a number of ways. The following table (Table 1) shows some ways in which post-reaction fluid 457 may be evaluated and/or characterized based on various non-limiting example analytical methods.

TABLE 1

| Analytical Method | Purpose/Result |
| --- | --- |
| Photograph | Overview of scale formation on materials |
| Inductively coupled plasma-optical emission spectrometry (ICP-OES) | Elemental analysis for fluid samples |

TABLE 1-continued

| Analytical Method | Purpose/Result |
| --- | --- |
| Ion Chromatography (IC) | Analyze water/brine composition |
| pH probe | Measure pH in water/brine samples |
| Inductively coupled plasma-mass spectrometry (ICP-MS) | Elemental analysis for fluid samples |
| Particle size analyzer | Analyze particle size and distribution |
| Stable isotope analysis | Measure stable isotope ratio |

In step 784, a determination is made as to whether adjustments need to be made to account for downhole conditions. Such adjustments may include, but are not limited to, the amount of time that the materials 475 are exposed to the fluid 437, the flow rate of the fluid 437 through the materials 475, and the pressure at which the materials 475 are under when exposed to the fluid 437. The determination may be made by a controller 404 using one or more algorithms 533 and/or one or more protocols 532. The determination may be based, at least in part, on information provided by a user 451, data collected from one or more sensor devices 460, results of one or more algorithms 533, and/or stored data 534 in the storage repository 531. If adjustments need to be made to account for downhole conditions, then the process proceeds to step 787. If adjustments do not need to be made to account for downhole conditions, then the process proceeds to step 785.

In step 785, a determination is made as to whether the post-reaction fluid 457 is optimal. The determination may be made by a controller 404 based on the data obtained to that point and using one or more protocols 532 and/or algorithms 533. The decision to adjust the post-reaction fluid 457 may be based on one or more of a number of factors, including but not limited to the size and/or amount of accumulated scale in the materials 475, a change in the shape and/or size of the proppant 112 within the materials 475, the condition of the flow channels through the materials 475, and a change in the environment (e.g., pressure, temperature) of the materials 475 in the testing vessel 482.

In some cases, this step 785 may include providing a recommendation about the post-reaction fluid 457. The recommendation may be provided by a controller 404 (or a recommendation component thereof) using one or more protocols 532. The recommendation may be provided to one or more users 451 (including associated user systems 455) and/or the network manager 480. The recommendation about the post-reaction fluid 457 may provide any level of detail about the post-reaction fluid 457, including but not limited to the precise composition of the post-reaction fluid 457, the positive and/or negative effects of the post-reaction fluid 457 on the materials 475, and the expected results (e.g., improves production by approximately 75%) of using the post-reaction fluid 457 in the field operation. If the post-reaction fluid 457 is optimal, then the process proceeds to the END step. If the post-reaction fluid 457 is not optimal, then the process proceeds to step 786.

In step 786, the fluid 437 is adjusted. In other words, at least one aspect (e.g., an amount or concentration of a fluid component 427, removal of a fluid component 427, addition of a fluid component 427) of the fluid 437 is changed. The fluid 437 may be adjusted by a controller 404 (or an adjusting component thereof) using one or more algorithms 533 and/or one or more protocols 532. The controller 404 may also determine precisely how the fluid 437 should be adjusted. Alternatively, the fluid 437 may be adjusted by a user 451. In such a case, a controller 404 may provide instructions to the user 451 (or an associated user system 455) as to how the fluid 437 should be adjusted. When step 786 is finished, the process reverts to step 781.

In step 787, one or more adjustments are made to account for downhole conditions. In some cases, an adjustment may be made by a controller 404 (or an adjustment component thereof) using one or more algorithms 533 and/or one or more protocols 532. Alternatively, an adjustment may be made by a user 451 based on information provided to the user 451 (including an associated user system 455) by a controller 404. In certain example embodiments, an adjustment is made to an algorithm 533 and/or a protocol 532. In addition, or in the alternative, an adjustment may be made to the environment that the materials 475 experience in the testing vessel 472 of the reaction module 470. When step 787 is complete, the process reverts to step 781.

Figure 8:
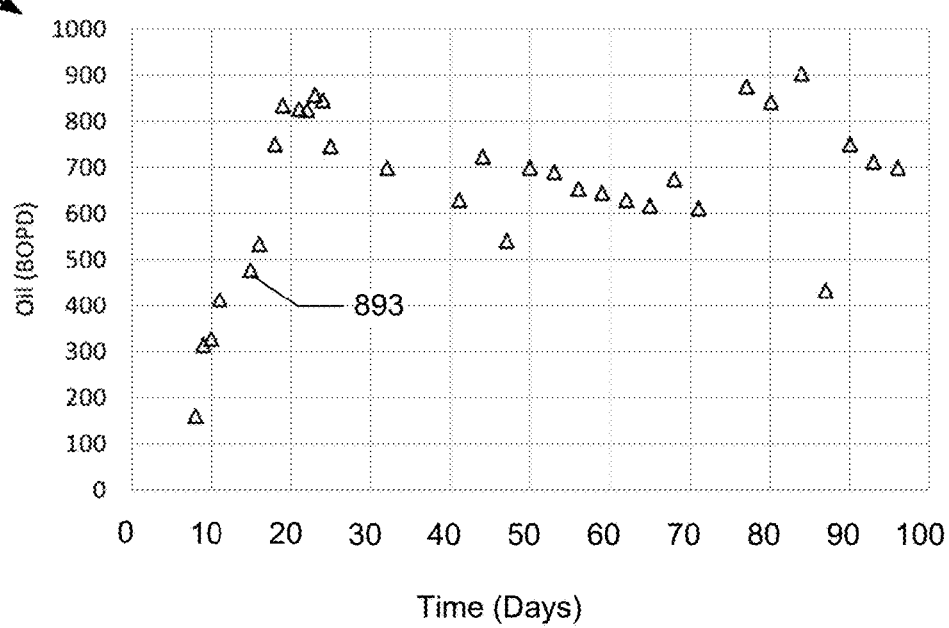
FIG. 8 shows a graph of the production of a subterranean resource using a fluid over time in the current art.

FIG. 8 shows a graph 897 of production of a subterranean resource 111 using a fluid 437 over time in the current art. Referring to FIGS. 1A through 8, the graph 897 of FIG. 8 has one plot 893 that is laid out with production per day along the vertical axis and time (in days) along the horizontal axis. A fluid component 427 of the fluids 437 used for the plot 893 in the graph 897 includes 15% hydrochloric acid (HCl). To generate the plot 893 in the graph 897 of FIG. 8, the fluid 437 is run through fractures 101 in a subterranean formation 110 at a rate of 21 gallons per foot. Plot 893 represents the production of oil in units of barrels. Over the 100-day testing period shown in the graph 897, the production of oil ranges between 250 barrels per day and 1000 barrels per day.

Figure 9:
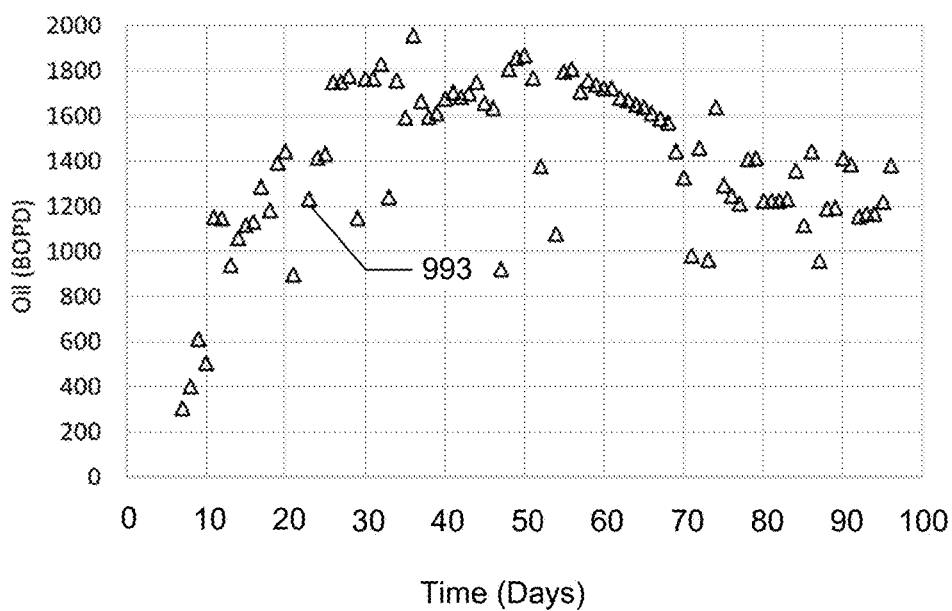
FIG. 9 shows a graph of the production of a subterranean resource using the fluid of FIG. 8 at a different flow rate over time in the current art.

FIG. 9 shows a graph 997 of production of the same subterranean resource 111 in FIG. 8 using the same fluid 437 as in FIG. 8 over time in the current art. Referring to FIGS. 1A through 9, the graph 997 of FIG. 9 has one plot 993 that is laid out with production per day along the vertical axis and time (in days) along the horizontal axis. As in FIG. 8, a fluid component 427 of the fluids 437 used for the plot 993 in the graph 997 includes 15% hydrochloric acid (HCl). To generate the plot 893 in the graph 997 of FIG. 9, the fluid 437 is run through the fractures 101 in the subterranean formation 110 used in FIG. 8 at a rate of 10 gallons per foot, which is a bit less than half the flow rate used in FIG. 8. Plot 993 represents the production of oil in units of barrels. Over the 100-day testing period shown in the graph 997, the production of oil ranges between 1000 barrels per day and 2000 barrels per day, which is more than a 50% increase relative to the production of oil when the flow rate of the fluid 437 is doubled. These graphs 897 and 997 lead to the conclusion that there is an inverse relationship between the production rate of the subterranean resource 111 (in these cases, oil) and the flow rate of the fluid 437 through the fractures 101 in the subterranean formation 110.

Figure 10:
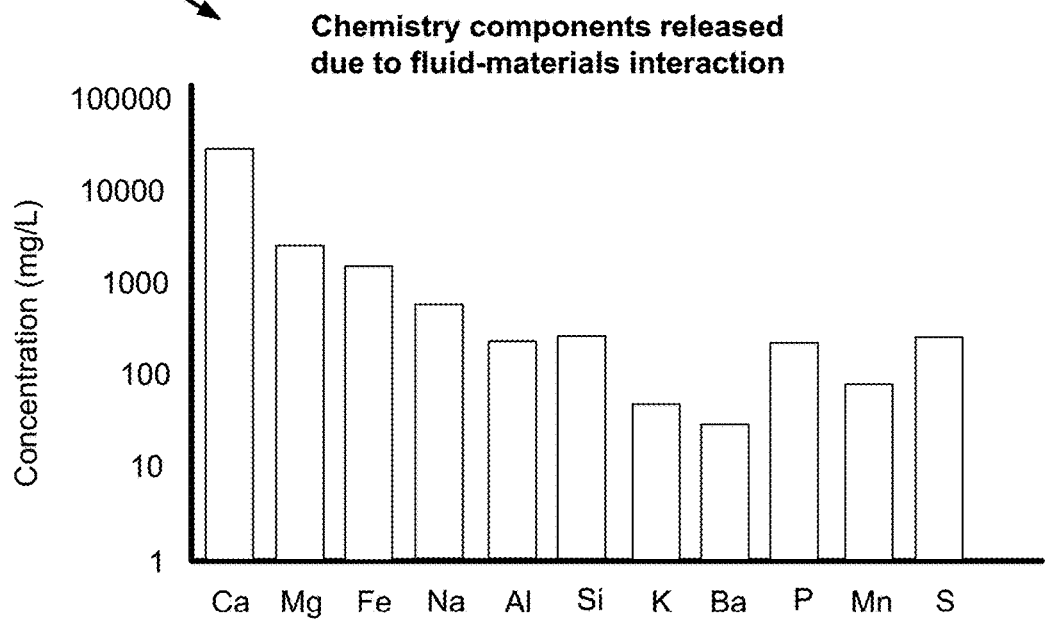
FIG. 10 shows a graph of chemistry components that are released when the fluid of FIGS. 8 and 9 interact with a subterranean formation according to certain example embodiments.

However, the graph 897 of FIG. 8 and the graph 997 of FIG. 9 do not show the secondary effects of the fluid 437 (in this example, 15% HCl) on the materials 475 that include rock in the form of shale. FIG. 10 shows a graph 1098 of chemistry components that are released when the fluid of FIGS. 8 and 9 interact with a subterranean formation according to certain example embodiments. Referring to FIGS. 1A through 10, the graph 1098 of FIG. 10 shows concentration (in mg/L) on a log scale along the vertical axis and eleven (11) chemistry components along the horizontal axis. The graph 997 shows that interaction between the fluid 437 and the materials in the volume 190 releases approximately 30,000 mg/L of calcium (Ca), approximately 3,000 mg/L of magnesium (Mg), approximately 1,100 mg/L of iron (Fe), approximately 500 mg/L of sodium (Na), approximately 300 mg/L of aluminum (Al), approximately 130 mg/L of silicon (Si), approximately 50 mg/L of potassium (K), approximately 12 mg/L of barium (Ba), approximately 110 mg/L of phosphorus (P), approximately 70 mg/L of manganese (Mn), and approximately 105 mg/L of sulfur (S).

Figure 11:
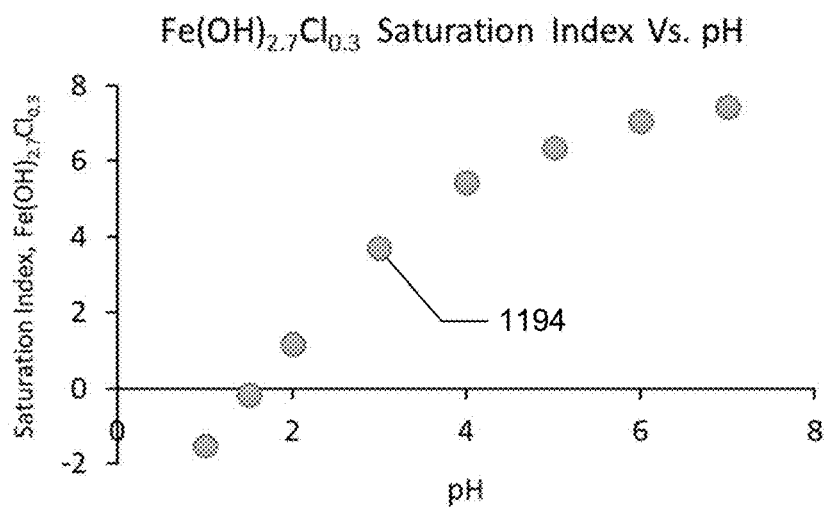
FIG. 11 shows a graph of the saturation index of ferric hydroxide according to certain example embodiments.

FIG. 11 shows a graph 1199 of the saturation index of ferric hydroxide $Fe(OH)_3$ (or a variation thereof, such as $Fe(OH)_{2.7}Cl_{0.3}$) according to certain example embodiments. Referring to FIGS. 1A through 11, the graph 1199 of FIG. 11 one plot 1194 of the saturation index along the vertical axis and pH values along the horizontal axis. In this example, a post-reaction fluid 457 includes 1 mg/L of $Fe^{3+}$ in 1M of NaCl at 170° F. The ferric hydroxide is formed when ferrous iron, released as a consequence of a reaction of a fluid 437 with materials 475 that includes rock, is oxidized, as shown by the chemical equation: $Fe^{2+}+O_2 \rightarrow Fe^{3+}+Fe(OH)_3$. The results of the plot 1194 show that the solubility of $Fe^{3+}$ is lower than 1 mg/L in 1M NaCl (TDS 58440 mg/L) fluid at pH 2 and above at 170° F.

Figure 12:
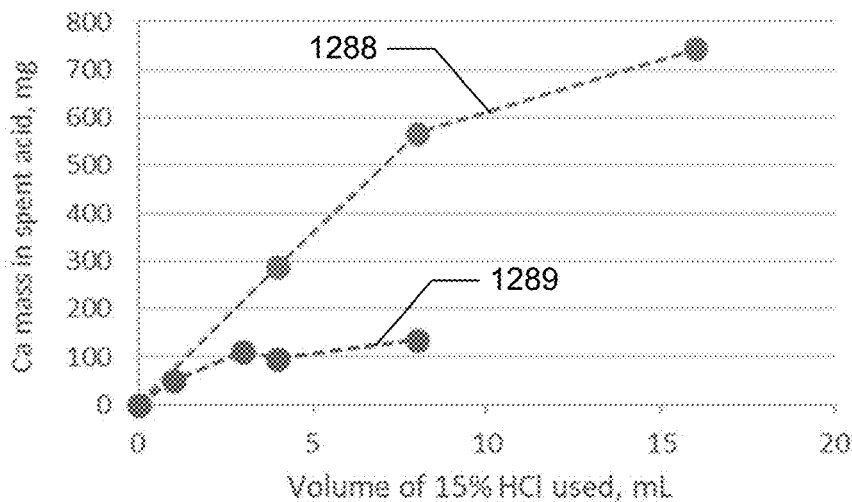
FIGS. 12 through 14 show graphs of various chemistry components included in post-reaction fluids according to certain example embodiments.
Figure 13:
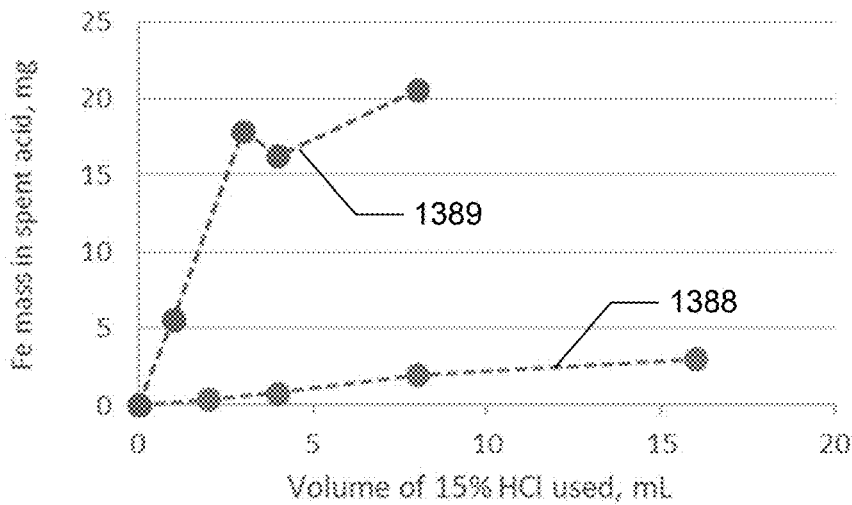
Figure 14:
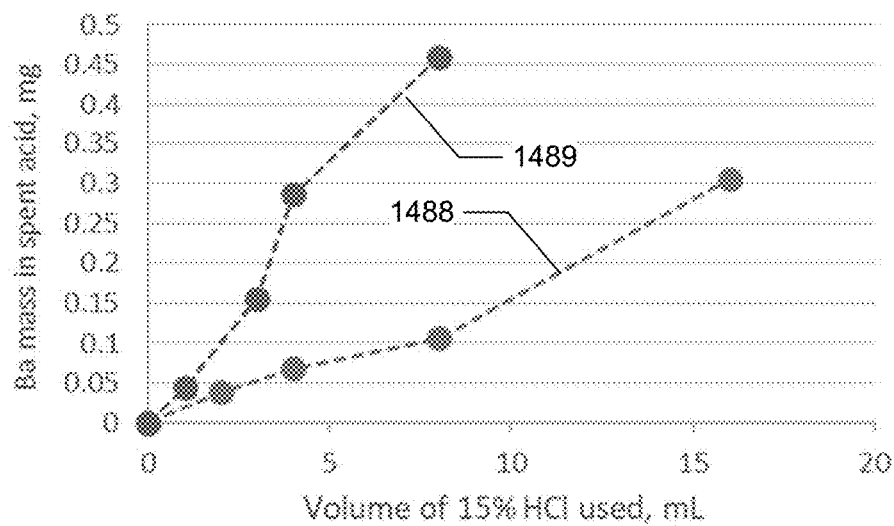

FIGS. 12 through 14 show graphs of various chemistry components included in post-reaction fluids according to certain example embodiments. Specifically, FIG. 12 shows a graph 1296 of calcium in two different post-reaction fluids 457. FIG. 13 shows a graph 1396 of iron in two other different post-reaction fluids 457. FIG. 14 shows a graph 1496 of barium in yet two other different post-reaction fluids 457. Referring to FIGS. 1A through 14, the graph 1296 of FIG. 12 shows two plots of the mass (in mg) of calcium in a post-reaction fluid 457 along the vertical axis versus the volume (in mL) of fluid 437 (which includes 15% HCl in this case). The calcium is a byproduct of the reaction of the fluid 437 with materials 475 that becomes part of the post-reaction fluid 457. Plot 1288 shows that, for one set of materials 475, the mass of calcium in the post-reaction fluid 457 increases linearly as the volume of fluid 437 is increased until the volume of the fluid 437 reaches about 8 mL, at which point the increase in the mass of the calcium in the post-reaction fluid 457 increases more slowly but still linearly with the increase in volume of the fluid 437. Plot 1289 shows that, for a different set of materials 475, the mass of calcium in the post-reaction fluid 457 increases linearly as the volume of fluid 437 is increased until the volume of the fluid 437 reaches about 3 mL, at which point the mass of the calcium in the post-reaction fluid 457 remains around 100 mg with the increase in the volume of the fluid 437.

FIG. 13 shows two plots of the mass (in mg) of iron in a post-reaction fluid 457 along the vertical axis versus the volume (in mL) of fluid 437 (which includes 15% HCl in this case). The iron is a byproduct of the reaction of the fluid 437 with materials 475 that becomes part of the post-reaction fluid 457. Plot 1388 shows that, for one set of materials 475, the mass of iron in the post-reaction fluid 457 increases linearly at a slow rate as the volume of fluid 437 is increased, ending at about 3 mg of iron in the post-reaction fluid 457 when the volume of fluid 437 is around 16 mL. Plot 1389 shows that, for a different set of materials 475, the mass of iron in the post-reaction fluid 457 increases linearly and at a steep rate as the volume of fluid 437 is increased until the volume of the fluid 437 reaches about 3 mL, at which point the mass of the iron in the post-reaction fluid 457 increases at a significantly slower rate with further increases in the volume of the fluid 437.

FIG. 14 shows two plots of the mass (in mg) of barium in a post-reaction fluid 457 along the vertical axis versus the volume (in mL) of fluid 437 (which includes 15% HCl in this case). The barium is a byproduct of the reaction of the fluid 437 with materials 475 that becomes part of the post-reaction fluid 457. Plot 1488 shows that, for one set of materials 475, the mass of barium in the post-reaction fluid 457 increases linearly at a relatively slow rate as the volume of fluid 437 is increased to about 8 mL, after which the mass of barium in the post-reaction fluid 457 increases linearly at a faster rate as the volume of fluid 437 is further increased. Plot 1489 shows that, for a different set of materials 475, the mass of barium in the post-reaction fluid 457 increases substantially linearly and at a steep rate as the volume of fluid 437 is increased up to approximately 8 mL.

Similarly, ion type and ion concentration (referring to chemistry components) in produced water may have an influence on asphaltene interactions at liquid-liquid and solid-liquid interfaces within a volume 190 during a field operation. The generation of divalent/trivalent cations (e.g., $Fe^{3+}$, $Al^{3+}$, etc.) as chemistry components from the interaction of a fluid (e.g., an acid) with downhole materials 475 may promote asphaltene deposition risk.

The results of several experiments show the effectiveness of example embodiments. For example, in one series of experiments, 2 grams of washed and dried drill cuttings (the materials 475) react with a fluid 437 of 2 mL of acid for 2 minutes at 165° F. After the 2 minutes, frac water (another fluid 437) is added to the resulting mixture. For purposes of this example, this resulting mixture is the subject of the experiments. In this experiment, the frac water has a pH of 6.3, and at least some of the composition of the frac water is shown in Table 2 below, where the listed elements may be in ionic form:

TABLE 2

| Element | Concentration (mg/L) |
| --- | --- |
| Sodium (Na) | 27000 |
| Potassium (K) | 400 |
| Magnesium (Mg) | 600 |
| Calcium (Ca) | 3000 |
| Strontium (Sr) | 800 |
| Chlorine (Cl) | 49704 |

The frac water (the fluid 437) may also include different types of chemical additives, including but not limited to scale inhibitor, fraction reducer, and surfactant. These chemical additives, when present in the fluid 437, may vary in their concentrations. Table 3 shows information about 12 different experiments of mixing the subject of the experiments with different versions of the frac water. The designation "PPT" means that scale depositions in the form of white precipitates have visibly formed on the surface of the cuttings.

TABLE 3

| Exp. # | Frac Water (mD) | Friction Reducer (ppm) | Surfactant (ppm) | Total Scale Inhibitor (ppm) | Liquid/Rock (ml/g) | Observation after 1 hour | Observation after 20 hours |
| --- | --- | --- | --- | --- | --- | --- | --- |
| 1 | 8 | 0 | 0 | 0 | 5 | Clear | Clear |
| 2 | 8 | 1000 | 0 | 0 | 5 | Cloudy | Cloudy |
| 3 | 8 | 0 | 1000 | 0 | 5 | Cloudy | PPT |
| 4 | 8 | 0 | 500 | 0 | 5 | Cloudy | PPT |
| 5 | 8 | 0 | 100 | 0 | 5 | Cloudy | PPT |
| 6 | 8 | 0 | 0 | 500 | 5 | PPT | PPT |
| 7 | 8 | 1000 | 500 | 500 | 5 | PPT | PPT |
| 8 | 18 | 1000 | 500 | 500 | 10 | PPT | PPT |
| 9 | 28 | 1000 | 500 | 500 | 15 | PPT | PPT |

FIG. 15 shows several testing vessels 1572 of a reaction module 1570 according to certain example embodiments. Specifically, the reaction module 1570 of FIG. 15 shows the results of experiments conducted in four testing vessels 1572 that are each in the form of bottles. In this case, each testing vessel 1572 may serve as both a reaction module (e.g., reaction module 470) and a post-reaction fluid collection system (e.g., post-reaction fluid collection system 450). Referring to FIGS. 1A through 15, testing vessel 1572-1 corresponds to experiment number 3 listed in Table 3 above. Testing vessel 1572-2 corresponds to experiment number 4 listed in Table 3 above. Testing vessel 1572-3 corresponds to experiment number 5 listed in Table 3 above. Testing vessel 1572-4 corresponds to experiment number 6 listed in Table 3 above.

Each testing vessel 1572 has a material 1575 in the form of rock cuttings. Also, each testing vessel 1572 is filled (in this case, partially) with a fluid (e.g., fluid 437) that interacts with the material 1575. Over time, the fluid becomes a post-reaction fluid 1557, and scale depositions 1513 may accumulate on the material 1575 in each testing vessel 1572 as a result of the interaction between the material 1575 and the fluid, which transforms to the post-reaction fluid 1557. Specifically, scale depositions 1513-1 form on the material 1575-1 immersed in the fluid (and subsequently transforming into the post-reaction fluid 1557-1) in testing vessel 1572-1 for 20 hours. Scale depositions 1513-2 form on the material 1575-2 immersed in the fluid (and subsequently transforming into the post-reaction fluid 1557-2) in testing vessel 1572-2 for 20 hours. Scale depositions 1513-3 form on the material 1575-3 immersed in the fluid (and subsequently transforming into the post-reaction fluid 1557-3) in testing vessel 1572-3 for 20 hours. Scale depositions 1513-4 form on the material 1575-4 immersed in the fluid (and subsequently transforming into the post-reaction fluid 1557-4) in testing vessel 1572-2 for 20 hours.

In the experiments summarized in Table 3, there was no separation of oil and water observed. However, as different chemicals (e.g., different acids, different chelants, a combination of acids, a combination of chelants, a combination of one or more acids and one or more chelants) are added to and/or removed from the solution (e.g., the fluid 437, the post-reaction fluid 1537), different interactions with those chemicals to the materials 1575 may lead to different results.

As another example, experiments for example embodiments have shown that the formation of scale depositions (e.g., scale depositions 213) may be caused by using a fluid (e.g., fluid 437) that includes one or more chemical products (a type of fluid component 427) having hydrofluoric acid (HF). In field operations directed to well stimulation, HF-based chemical products are used at times. As a result, based on experiments for example embodiments, calcium fluoride ($CaF_2$) may be a post-reaction fluid 457 based on a mixture of the spent acid (which contains $F^-$) and formation water (which contains Ca). Table 4 below shows a summary of experiment results that may be achieved by varying the ratio of acid for formation water.

TABLE 4

| | Amount of Acid Solution | | |
| --- | --- | --- | --- |
| | 10% | 50% | 90% |
| | Amount of Formation Water | | |
| | 90% | 50% | 10% |
| $CaF_2$ Saturation Index (modeled) | 4.44 | 5.46 | 5.18 |
| $CaF_2$ (mg/L) | 3049 | 2364 | 473 |
| $CaF_2$ from 1000 bbl aqueous phase (kg) | 485 | 376 | 75 |

When an acid product containing HF is used for well stimulation and/or the removal of scale depositions 213 and fines, the resulting chemical reaction with the materials 475 may result in the formation of $CaF_2$ precipitates while dissolving calcite scale.

FIG. 16 shows several testing vessels 1672 of another reaction module 1670 according to certain example embodiments. Specifically, the reaction module 1670 of FIG. 16 shows the results of experiments conducted in five testing vessels 1672 that are each in the form of bottles. In this case, each testing vessel 1672 may serve as both a reaction module (e.g., reaction module 470) and a post-reaction fluid collection system (e.g., post-reaction fluid collection system 450). Referring to FIGS. 1A through 16, each testing vessel 1672 has multiple materials (similar to the materials 475 discussed above), where one material 1675 is in the form of cuttings from formation rock retrieved from a wellbore, and another material 1775 is in the form of oil retrieved from the wellbore. Also, each testing vessel 1672 is filled (in this case, partially) with a fluid (e.g., fluid 437) that interacts with the materials 1675, 1775. Over time (e.g., 24 hours, one month), the fluid becomes a post-reaction fluid 1657, and scale depositions 1613 (e.g., rust) may accumulate on the material 1675 in a testing vessel 1672 as a result of the interaction between the materials 1675, the materials 1775, and the fluid, which transforms to the post-reaction fluid 1657.

In this case, testing vessel 1672-1 shows a compatible system with stable suspended materials 1675-1 and materials 1775-1. Specifically, the materials 1675-1, the materials 1775-1, and the post-reaction fluid 1657-1 (which originates as a fluid (e.g., fluid 437) that includes a brine and a friction reducer) are comingled with no visually detectable scale depositions. Testing vessel 1672-2 shows a slightly less compatible system with mostly stable suspended materials 1675-2 and materials 1775-2. Specifically, most of the materials 1675-2, the materials 1775-2, and the post-reaction fluid 1657-2 (which originates as a fluid (e.g., fluid 437) that includes a brine and a friction reducer of different concentrations compared to the fluid used in the testing vessel 1672-1) are comingled. However, small amounts of the materials 1675-2 and the materials 1775-2 are settled on the bottom of the testing vessel 1672-2, and small amounts of visually detectable scale depositions 1613-2 have formed on the materials 1675-2 that have settled to the bottom of the testing vessel 1672-2.

Testing vessel 1672-3 shows an even slightly less compatible system compared to testing vessel 1672-2, with mostly stable suspended materials 1675-3 and materials 1775-3. Specifically, most of the materials 1675-3, the materials 1775-3, and the post-reaction fluid 1657-3 (which originates as a fluid (e.g., fluid 437) that includes a brine and a friction reducer of different concentrations compared to the fluid used in the testing vessel 1672-1 and the testing vessel 1672-2) are comingled. However, larger amounts of the materials 1675-3 and the materials 1775-3 are settled on the bottom of the testing vessel 1672-3, and larger amounts of visually detectable scale depositions 1613-3 have formed on the materials 1675-3 that have settled to the bottom of the testing vessel 1672-3.

Testing vessel 1672-4 shows an incompatible system, with most of the materials 1675-4 settled on the bottom of the testing vessel 1672-4, most of the materials 1775-4 collecting above the post-reaction fluid 1657-4 (which originates as a fluid (e.g., fluid 437) that includes a brine and a friction reducer of different concentrations compared to the fluid used in the testing vessel 1672-1 through the testing vessel 1672-3), and significant amounts of visually detectable scale depositions 1613-4 having formed on the materials 1675-4 that have settled to the bottom of the testing vessel 1672-4.

Testing vessel 1672-5 shows a system, with most of the materials 1675-5 settled on the bottom of the testing vessel 1672-5, most of the materials 1775-5 collecting above the post-reaction fluid 1657-5 (which originates as a fluid (e.g., fluid 437) that includes a brine and a friction reducer of different concentrations compared to the fluid used in the testing vessel 1672-1 through the testing vessel 1672-4), and significant amounts of visually detectable scale depositions 1613-5 having formed on the materials 1675-5 that have settled to the bottom of the testing vessel 1672-5. In this case, the post-reaction fluid 1657-5 is cloudier than the post-reaction fluid 1657-4.

Figure 17:
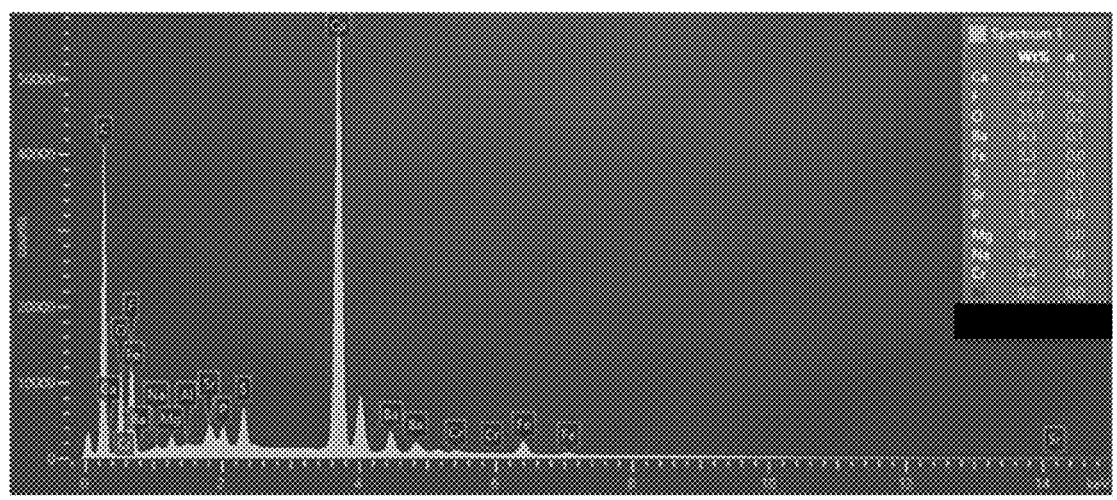
FIG. 17 shows a graph of elemental mapping by Energy Dispersive X-Ray Analysis (EDX) of filtered solids after a reaction involving HF according to certain example embodiments.

FIG. 17 shows a graph 1792 of elemental mapping by EDX of filtered solids after a reaction involving HF according to certain example embodiments. Referring to FIGS. 1A through 17, the graph 1792 of FIG. 17 shows that the filtered solids may include carbon, calcium, chromium, oxygen, fluorine, iron, barium, sodium, magnesium, aluminum, strontium, phosphorous, and sulfur. In alternative cases, the filtered solids may include fewer (e.g., one, three, six) elements than what are shown in FIG. 17. In other cases, there may be one or more of a number of additional or alternative solids, including but not limited to zinc and lead. The graph 1792 also shows that the molar ration of F to Ca is approximately 1.8, which is close to the stoichiometry of $CaF_2$, and that, while calcite is dissolved, $CaF_2$ is generated at the same time. A conclusion that may be drawn from the graph 1792 of FIG. 17 is that a fluid 437 that includes HF may not be an optimal choice for wells with materials 475 that have calcite scale issues or that have high calcite content in the rock.

Figure 18A:
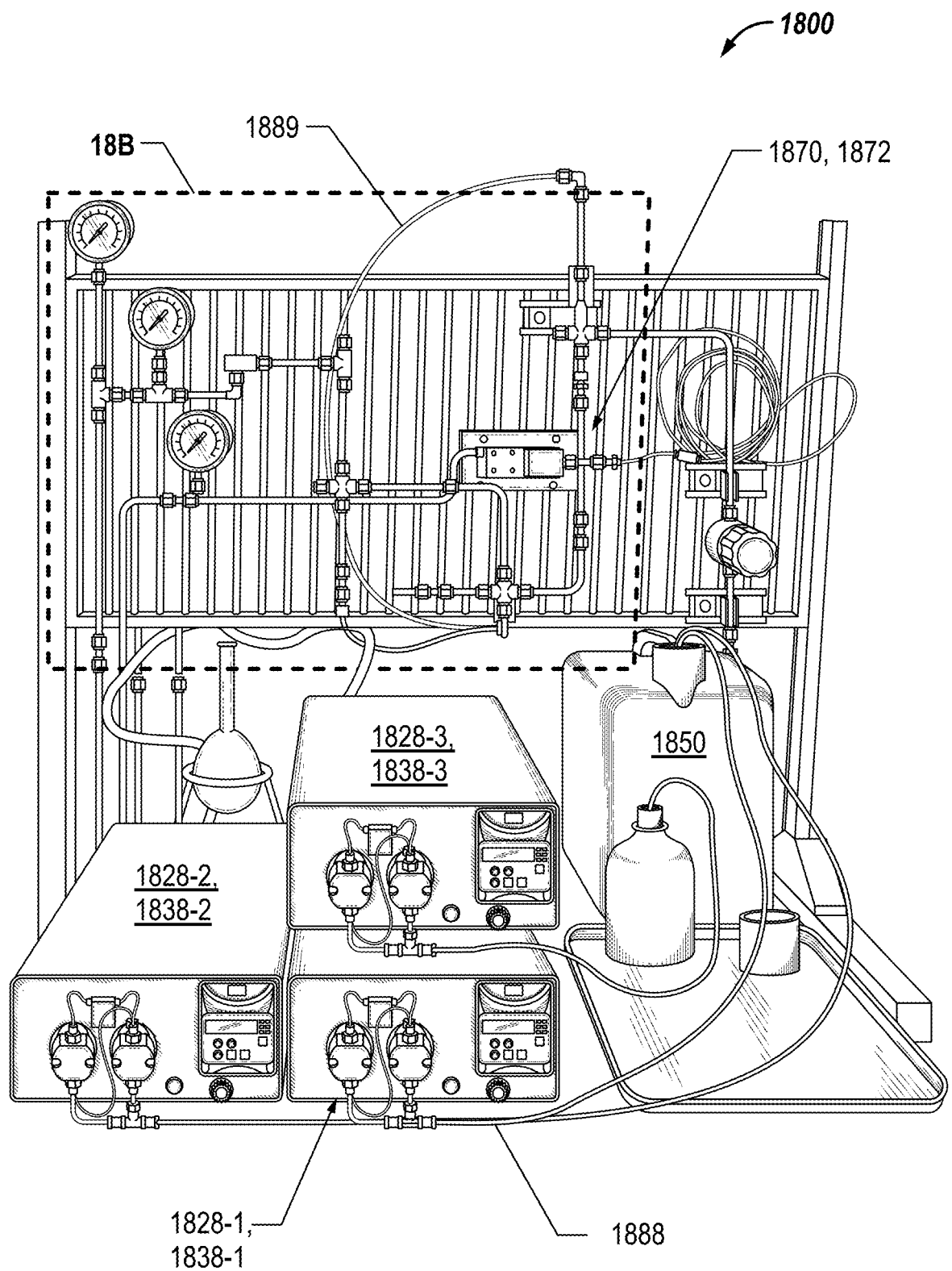
FIGS. 18A through 18C show an image of a testing system that is modeled after the testing system of FIG. 4 according to certain example embodiments.
Figure 18B:
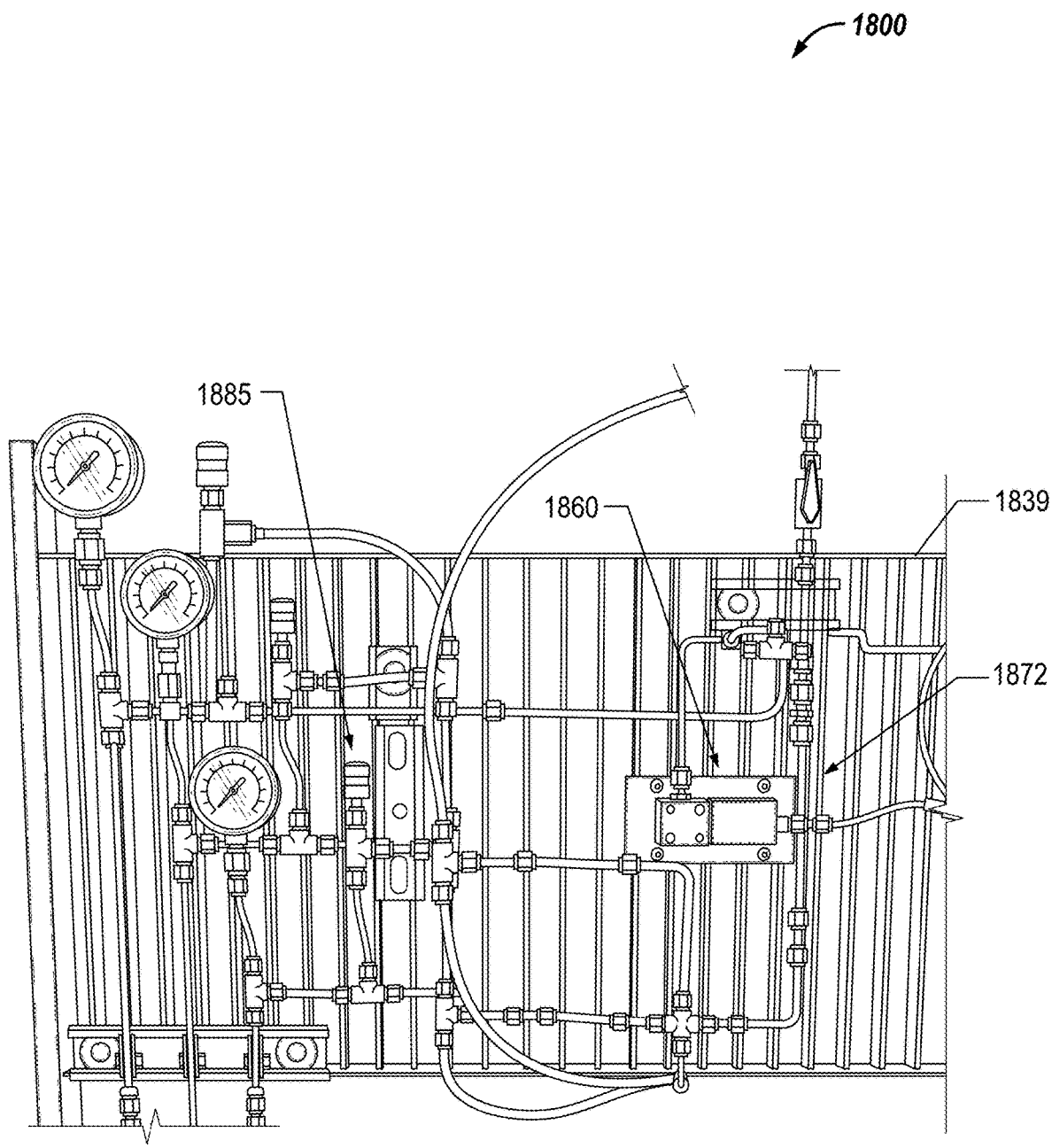
Figure 18C:
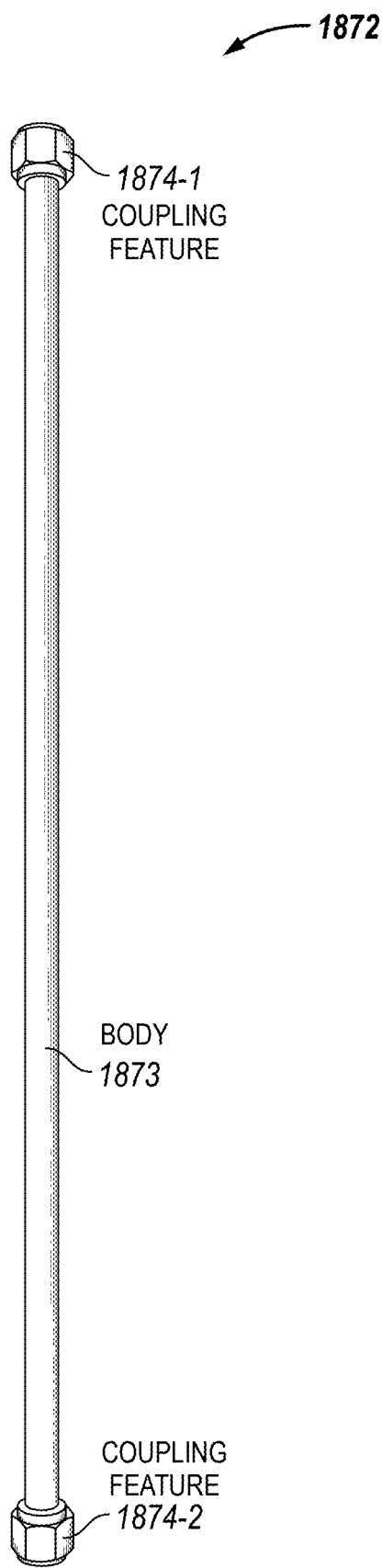

FIGS. 18A through 18C show an image of a testing system 1800 that is modeled after the testing system 400 of FIG. 4 according to certain example embodiments. Specifically, FIG. 18A shows a front view of the testing system 1800. FIG. 18B shows a detailed view of part of the testing system 1800. FIG. 18C shows a front view of the column 2172 of the testing system 1800. Referring to FIGS. 1A through 18C, the testing system 1800 of FIGS. 18A through 18C includes three fluid component sources 1828, three injection systems 1838, piping 1888, a sensor device 1860, a pressure relief valve 1885, a testing module 1870 with a column 1872 (a form of testing vessel 472) having materials (e.g., materials 475, hidden from view) disposed therein, and a post-reaction fluid collection system 1850. These components of the testing system 1800 are substantially similar to the corresponding components of the testing system 400 of FIG. 4.

The first fluid component source 1828 of FIG. 18A is in the form of an anion brine source 1828-1, which releases an anion brine (a form of a fluid component 427) that is moved toward the testing module 1870 by a pump 1838-1 (a form of an injection system 438) through piping 1888. The second fluid component source 1828 of FIG. 18A is in the form of a water source 1828-2, which releases a water solution (another form of a fluid component 427) that is moved toward the testing module 1870 by a pump 1838-2 (another form of an injection system 438) through piping 1888. In some cases, the water solution includes a scale inhibitor. The third fluid component source 1828 of FIG. 18A is in the form of a cation brine source 1828-3, which releases a cation brine (yet another form of a fluid component 427) that is moved toward the testing module 1870 by a pump 1838-3 (yet another form of an injection system 438) through piping 1888.

The three fluid component sources 1828 combine at a part of the piping 1888 upstream of the testing module 1870 that forms a header 1889. When the three fluid component sources 1828 combine in the piping 1888, a resulting fluid (similar to the resulting fluid 437 of FIG. 4), which includes the anion brine, the water solution, and the cation brine, flows through some of the piping 1888 to the testing module 1870. At the testing module 1870, the fluid flows through the column 1872 (a form of testing vessel 472). The column 1872 is filled (e.g., fully (packed), partly) with materials (hidden from view), such as proppant and formation rocks (e.g., cuttings).

The differential pressure sensor 1860 (a form of a sensor device 460) of the system 1800 measures the difference between the pressure of the fluid entering the column 1872 and the pressure of the post-testing fluid (substantially the same as the post-testing fluid 457 of FIG. 4) exiting the column 1872. The pressure relief valve 1885 may be adjusted when the values measured by the differential pressure sensor 1860 exceed a certain value or fall outside a range of values. The post-testing fluid, upon exiting the column 1872, flows through some of the piping 1888 to the post-reaction fluid collection system 1850, which is a form of the post-reaction fluid collection system 450 of FIG. 4. In this case, the column 1872, the differential pressure sensor 1860, the pressure relief valve 1885, and some of the piping 1888, including the header 1889, are mounted to a frame 1839 that is substantially vertical.

As discussed above, FIG. 18C shows an image of the column 1872 of the testing system 1800 according to certain example embodiments. The column 1872 in this case has a body 1873 having a cylindrical shape. The body 1873 in this case has an approximate length of 18 inches. In certain example embodiments, the length of the body 1873 of the column 1872 may range from 4 inches to 36 inches. The body 1873 of the column 1872 in this example is substantially cylindrical in shape with an inner diameter (ID) of approximately ⅛ inches and an approximate outside diameter (OD) of approximately ⅜ inch. In alternative embodiments, the body 1873 of the column 1872 may have other shapes that are not fully or partially cylindrical. In certain example embodiments, the ID of the body 1873 of the column 1872 may range from ⅛ inches to 2.5 inches, and the OD of the body 1873 of the column 1872 may range from ¼ inch to 3 inches.

The body 1873 of the column 1872 is designed to withstand the conditions (e.g., pressure, flow rate, acidity) at which the materials (e.g., materials 475) disposed therein and the fluid (e.g., fluid 437) flowing therethrough are tested. The body 1873 of the column 1872 may be made of one or more of any of a number of suitable materials, including but not limited to stainless steel, plexiglass, ceramics, PEEK, PTFE, corrosion resistant alloys (CRAs). In certain example embodiments, the inner walls of the body 1873 of the column 1872 may be featureless and smooth. The thickness of the wall of the body 1873 may be configured (e.g., $1/16^{th}$ inch thick to ½ inch thick) to withstand a minimum pressure (e.g., 500 psig), a normal testing pressure (e.g., 3000 psig), and/or a maximum pressure (e.g., 6000 psig) that may be used during testing. In some cases, the thickness of the wall of the body 1873 may be configured to be substantially uniform along its length.

The column 1872 may include one or more coupling features 1874 that are configured to couple the column 1872 to one or more other components (e.g., piping 1888) of the testing system 1800. For example, in this case, the column 1872 has two coupling features 1874, where one coupling feature 1874-1 is located toward one end of the body 1873 of the column 1872, and where the other coupling feature 1874-2 is located toward the opposite end of the body 1873 of the column 1872. In this case, the coupling features 1874 are configured substantially identically to each other in the form of threaded nuts that mate with complementary threads disposed on the outer perimeter of adjacent piping (e.g., piping 1888). In alternative embodiments, one or more of the coupling features 1874 may have a different configuration. Further, in alternative embodiments, the configuration of one coupling feature 1874 of the column 1872 may differ from the configuration of one or more of the other coupling features 1874 of the column 1872. In any case, the coupling features 1874 are configured to couple to one or more other components of the testing system so that the desired testing conditions (e.g., pressure, flow rate) may be maintained.

In any case, one or more of the dimensions (e.g., the length, the outer diameter, the thread size) of a coupling feature 1874 may change based on one or more of a number of factors, including but not limited to the characteristics (e.g., outer diameter, length) of the body 1873 of the column 1872 and the characteristics (e.g., outer diameter, thread size) of another component (e.g., piping 1888) of the testing system 1800 to which the a coupling feature 1874 of the column 1872 is configured to be coupled. For example, a coupling feature 1874 have an outer diameter that ranges from approximately ¼" to approximately 3" and a length that ranges from approximately ½" to approximately 1.5". In certain example embodiments, a coupling feature 1874 has a substantially uniform outer surface.

Example embodiments may be used to identify results (e.g., byproducts, elimination of chemistry components, addition of chemistry components) of the interaction of a fluid (e.g., an acid) with materials (e.g., rock, proppant, produced water) found downhole within a fractured volume within a subterranean formation. In some cases, example embodiments simulate downhole conditions to identify byproducts and/or other aspects of these results. Example embodiments may also analyze the effects of a post-reaction fluid on further interaction with resulting materials. Example embodiments may be used to fully or partially automate the process of identifying byproducts in post-reaction fluids and/or changes to the materials that are subject to an initial fluid, generating different post-reaction fluids from fluid components, providing a post-reaction fluid that itself flows through resulting materials in a testing vessel of a reaction module, and evaluating the effectiveness of the post-reaction fluid at optimizing a phase (e.g., completion, production) of a subterranean field operation. Example embodiments may also communicate the results of an evaluation of a post-reaction fluid, determine alternative post-reaction fluids that may be more effective, generate those alternative post-reaction fluids, and evaluate those alternative post-reaction fluids during and after testing. Using example embodiments, the materials that are tested may be subjected to conditions that mirror those of a subterranean formation (e.g., a fractured subterranean formation). Example embodiments may provide a number of benefits. Such benefits may include, but are not limited to, ease of use, extending the life of a producing well, optimize use of proppant in fractures, flexibility, configurability, and compliance with applicable industry standards and regulations.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for evaluating a chemical treatment at a subsurface for improved well performance, the method comprising:
   obtaining first information about an initial fluid flowing through a testing vessel for a period of time, wherein the first information comprises a differential pressure across the testing vessel, wherein the testing vessel contains a plurality of materials that is designed to be representative of the subsurface, wherein the plurality of materials comprises rock and proppant, and wherein the testing vessel maintains a substantially fixed position for the period of time as the initial fluid flows therethrough;
   obtaining second information about a post-reaction fluid that results from the initial fluid flowing through the testing vessel;
   performing, using the first information and the second information, a compatibility test on the post-reaction fluid and at least one of a group consisting of the initial fluid and the plurality of materials after the period of time; and
   evaluating, after performing the compatibility test, an effect of the post-reaction fluid on at least one of the group consisting of the initial fluid and the plurality of materials.

2. The method of claim 1, wherein the initial fluid comprises an acid.

3. The method of claim 1, wherein the initial fluid comprises a chelant.

4. The method of claim 1, wherein the post-reaction fluid comprises a chemistry composition that differs from that of the initial fluid.

5. The method of claim 4, wherein the chemistry composition of the post-reaction fluid comprises at least one of a group consisting of calcium, magnesium, iron, sodium, aluminum, barium, strontium, zinc, lead, silicon, potassium, phosphorous, manganese, and sulfur.

6. The method of claim 1, further comprising:
   determining that the post-reaction fluid causes adverse effects on well performance; and
   identifying an adjusted fluid to mitigate the adverse effects caused by the post-reaction fluid.

7. The method of claim 6, further comprising:
   generating the adjusted fluid;
   providing the adjusted fluid that flows through the plurality of materials inside the testing vessel for an additional period of time;
   performing a second compatibility test on a second post-reaction fluid and the plurality of materials after the additional period of time; and
   evaluating, after performing the second compatibility test, a second effect of the second post-reaction fluid on the plurality of materials.

8. The method of claim 1, further comprising:
adjusting an algorithm based on comparing an expected effect to the effect of the post-reaction fluid on the plurality of materials.

9. The method of claim 1, further comprising:
providing a recommendation about the post-reaction fluid after evaluating the effect of the post-reaction fluid on the plurality of materials.

10. The method of claim 1, further comprising:
controlling the conditions to which the testing vessel is subjected in the reaction module.

11. The method of claim 1, wherein performing the compatibility test comprises interacting the post-reaction fluid with the plurality of materials for an additional period of time.

12. The method of claim 1, wherein the plurality of materials comprises at least one of a group consisting of rock, proppant, oil, natural gas, and water.

13. The method of claim 1, wherein evaluating the effect of the post-reaction fluid on at least one of the group consisting of the initial fluid and the plurality of materials comprises modeling for at least one of a second group consisting of scale and corrosion.

14. A system for evaluating a chemical treatment at a subsurface for improved well performance, the system comprising:
a post-reaction fluid collection system that is configured to receive a post-reaction fluid from a reaction module, wherein the post-reaction fluid comprises an initial fluid after the initial fluid flows through a plurality of materials in a testing vessel of the reaction module, wherein the plurality of materials comprises rock and proppant, wherein the plurality of materials is designed to be representative of the subsurface, wherein the reaction module is further configured to provide the initial fluid that flows through plurality of materials in the testing vessel for a period of time, wherein first information about the post-reaction testing fluid is obtained after the post-reaction testing fluid has been received by the post-reaction fluid collection system, wherein the reaction module is configured to maintain a substantially fixed position for the period of time, wherein the first information is used, along with second information about a plurality of materials within the reaction module, to perform a compatibility test between the post-reaction fluid and at least one of a group consisting of the initial fluid and the plurality of materials after the period of time, wherein the second information comprises a differential pressure across the reaction module, and wherein the compatibility test is used to evaluate an effect of the post-reaction fluid on at least one of the group consisting of the initial fluid and the plurality of materials.

15. The system of claim 14, further comprising:
a plurality of sensor devices configured to measure a plurality of parameters associated with the post-reaction fluid and the plurality of materials after the period of time.

16. The system of claim 15, further comprising:
a controller communicably coupled to the plurality of sensor devices, wherein the controller is configured to evaluate an effect of the post-reaction fluid on the plurality of materials after the period of time using measurements made by the plurality of sensor devices.

17. The system of claim 14, wherein the reaction module is configured to simulate downhole conditions at the subterranean formation on the testing vessel.

18. The system of claim 14, further comprising:
a plurality of fluid component sources that contain a plurality of fluid components, wherein each of the plurality of fluid component sources contains a fluid component of the fluid; and
a plurality of injection systems, wherein each of the plurality of injection systems is configured to move each fluid component toward the reaction module.

19. The system of claim 18, further comprising:
an integration component that is configured to receive each fluid component and combine the plurality of fluid components to form the initial fluid.

20. A method for evaluating a chemical treatment at a subsurface for improved well performance, the method comprising:
combining an initial fluid and a plurality of materials in a testing vessel for a period of time, wherein the testing vessel maintains a substantially fixed position for the period of time, wherein the plurality of materials is designed to be representative of the subsurface, and wherein the plurality of materials comprises rock and proppant;
removing a post-reaction fluid from the testing vessel after the period of time, wherein the post-reaction fluid results after combining the initial fluid and the plurality of materials;
measuring a differential pressure across the testing vessel as the initial fluid is introduced to the testing vessel and as the post-reaction fluid is removed from the testing vessel;
performing a compatibility test on the post-reaction fluid and at least one of a group consisting of the initial fluid and the plurality of materials after the period of time using the differential pressure and data obtained about the initial fluid, the plurality of materials, and the post-reaction fluid; and
evaluating, based on results of the compatibility test, an effect of the post-reaction fluid on at least one of the group consisting of the initial fluid and the plurality of materials.

* * * * *